(12) United States Patent
Ichino

(10) Patent No.: US 9,379,853 B2
(45) Date of Patent: Jun. 28, 2016

(54) PACKET RETRANSMISSION CONTROL DEVICE, PACKET RETRANSMISSION CONTROL METHOD, AND PACKET RETRANSMISSION CONTROL PROGRAM

(75) Inventor: Kiyohisa Ichino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 381 days.

(21) Appl. No.: 13/137,170

(22) Filed: Jul. 25, 2011

(65) Prior Publication Data
US 2011/0286449 A1  Nov. 24, 2011

Related U.S. Application Data

(63) Continuation of application No. PCT/JP2011/055072, filed on Mar. 4, 2011.

(30) Foreign Application Priority Data

Mar. 15, 2010 (JP) .................. 2010-057381
Nov. 4, 2010 (JP) .................. 2010-247902

(51) Int. Cl.
*H04L 12/26* (2006.01)
*H04L 1/18* (2006.01)

(52) U.S. Cl.
CPC ............ *H04L 1/1887* (2013.01); *H04L 1/1874* (2013.01)

(58) Field of Classification Search
USPC ......... 370/216, 229, 230, 242, 248, 252, 254, 370/351, 389
See application file for complete search history.

(56) References Cited

U.S. PATENT DOCUMENTS

| 8,493,867 | B1* | 7/2013 | Cheriton ................. 370/236 |
| 2011/0270956 | A1* | 11/2011 | McDysan et al. ............ 709/220 |
| 2012/0321013 | A1* | 12/2012 | Christiaens et al. .......... 375/295 |

FOREIGN PATENT DOCUMENTS

| JP | 7-336366 A | 12/1995 |
| JP | 8-008995 A | 1/1996 |

(Continued)

OTHER PUBLICATIONS

Toru Takamichi, et al., "Ultra-High Speed MAC Technology for Terabit-Class LAN", Proceedings of the IEICE Communications Society Conference, Sep. 2008, pp. S-77 to S-78.

(Continued)

*Primary Examiner* — Yemane Mesfin
*Assistant Examiner* — Mon Cheri Davenport
(74) *Attorney, Agent, or Firm* — McGinn IP Law Group PLLC

(57) ABSTRACT

A packet retransmission control device has a flow table and a processing determination unit. The flow table indicates, with respect to each of flows to which packets belong, retransmission management information for managing retransmission control. The retransmission management information includes, as a retransmission management parameter, at least one of a packet retransmission count and a delay excess count. The processing determination unit refers to the flow table to determine whether or not to apply the retransmission control to packets. Specifically, when receiving a packet from the upper layer, the processing determination unit refers to the flow table to obtain the retransmission management parameter associated with a flow to which the received packet belongs. If the retransmission management parameter is not more than a threshold value, the processing determination unit determines to apply the retransmission control to the received packet. If the retransmission management parameter exceeds the threshold value, the processing determination unit stops application of the retransmission control to the received packet.

20 Claims, 19 Drawing Sheets

(56) References Cited

FOREIGN PATENT DOCUMENTS

| | | |
|---|---|---|
| JP | 10-056480 A | 2/1998 |
| JP | 2000-324321 A | 11/2000 |
| JP | 2007-288428 A | 11/2007 |

OTHER PUBLICATIONS

International Search Report—FormPCT/ISA/210 (second sheet), Jul. 2009.
Written Opinion of the International Searching Authority—Form PCT/ISA/237, Jul. 2009.

* cited by examiner

Fig. 4

27: FLOW TABLE

| Key | Value | | | | |
|---|---|---|---|---|---|
| 40: FLOW ENTRY | | | | | |
| 30 FLOW IDENTIFIER | 31 RTO | 32 RETRANSMISSION COUNT | 33 DELAY EXCESS COUNT | 41 LAST ACCESS TIME | 42 DELAY STATISTICS INFO. |
| 40: FLOW ENTRY | | | | | |
| 30 FLOW IDENTIFIER | 31 RTO | 32 RETRANSMISSION COUNT | 33 DELAY EXCESS COUNT | 41 LAST ACCESS TIME | 42 DELAY STATISTICS INFO. |
| ... | | | | | |
| 40: FLOW ENTRY | | | | | |
| 30 FLOW IDENTIFIER | 31 RTO | 32 RETRANSMISSION COUNT | 33 DELAY EXCESS COUNT | 41 LAST ACCESS TIME | 42 DELAY STATISTICS INFO. |

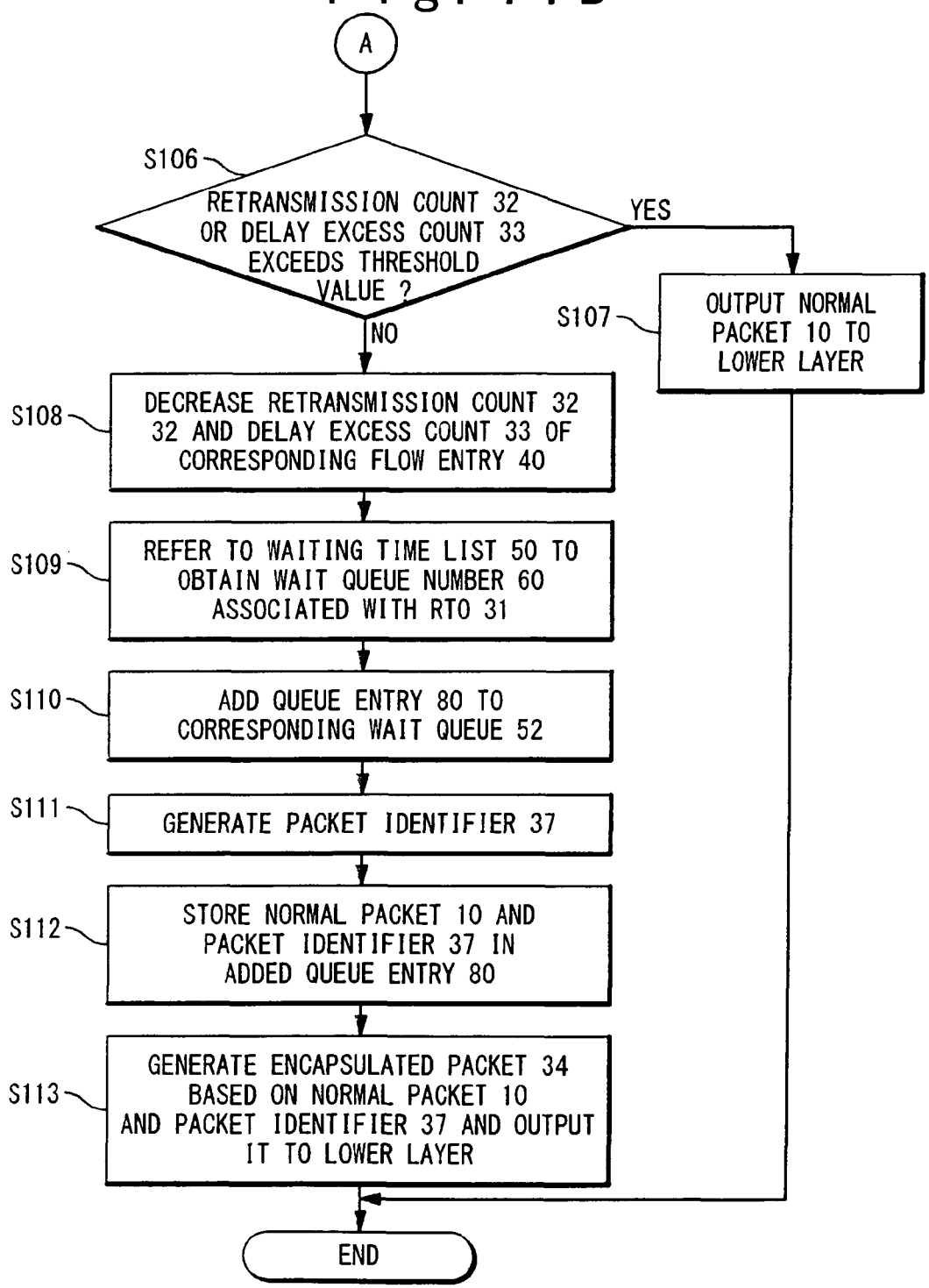

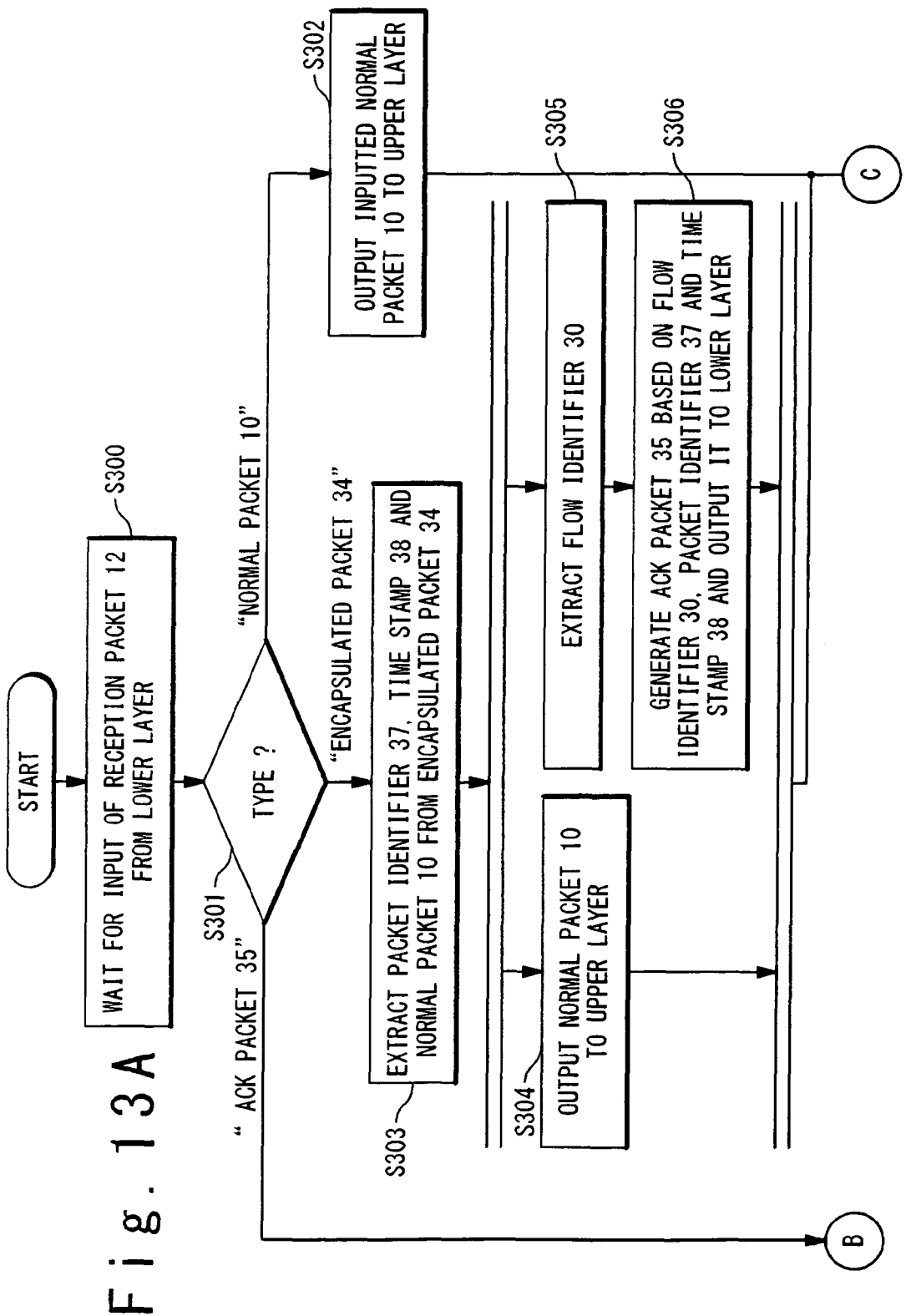

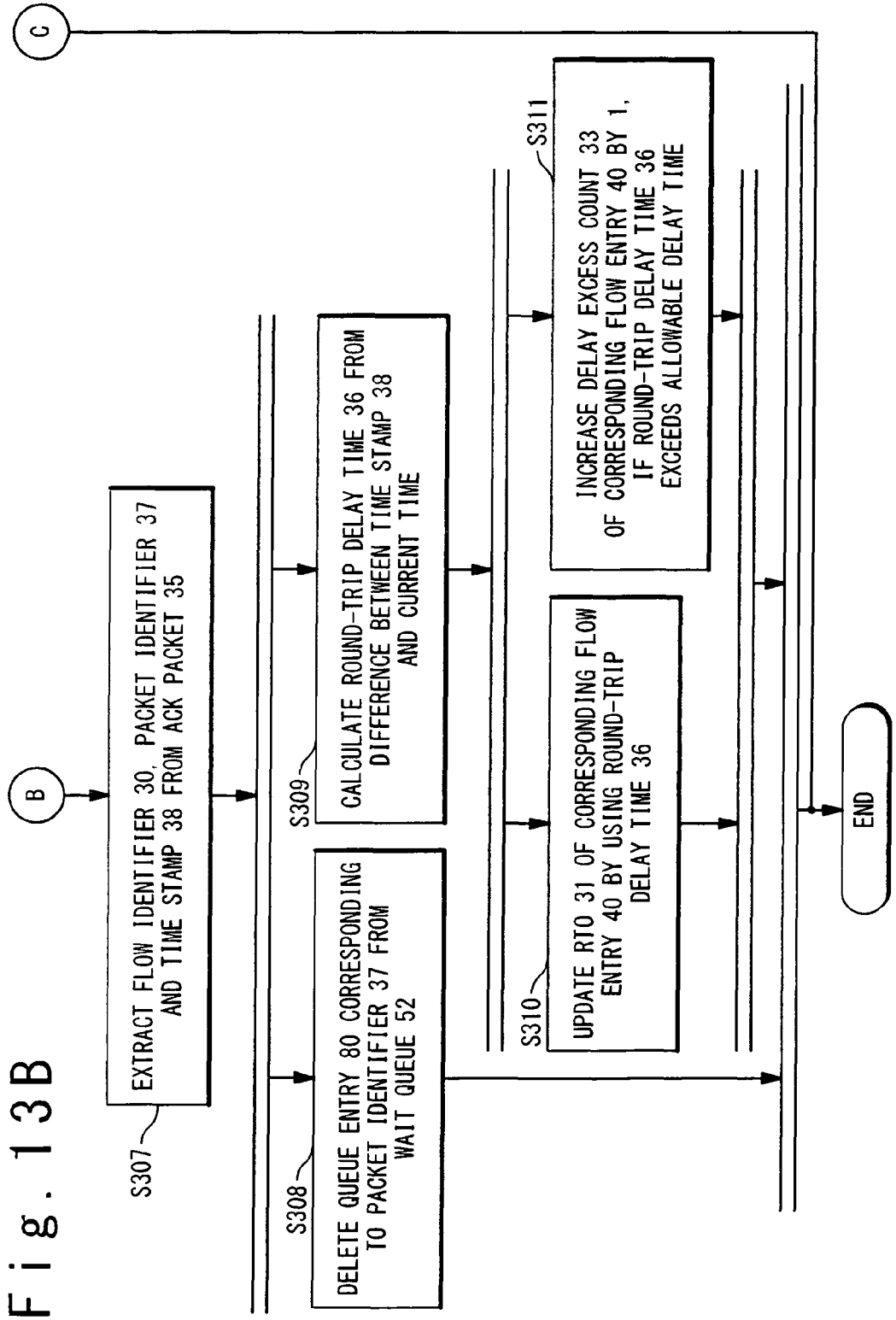

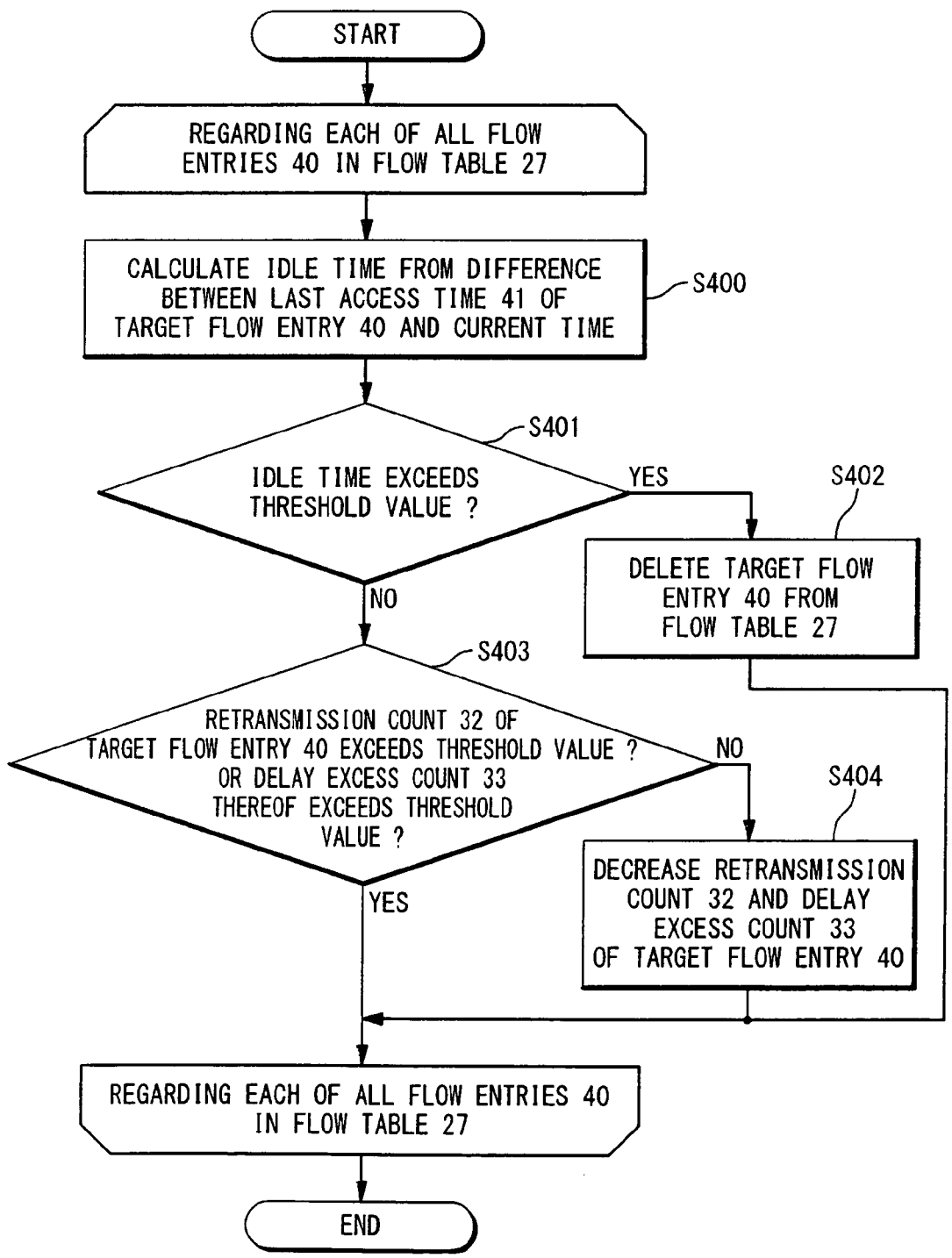

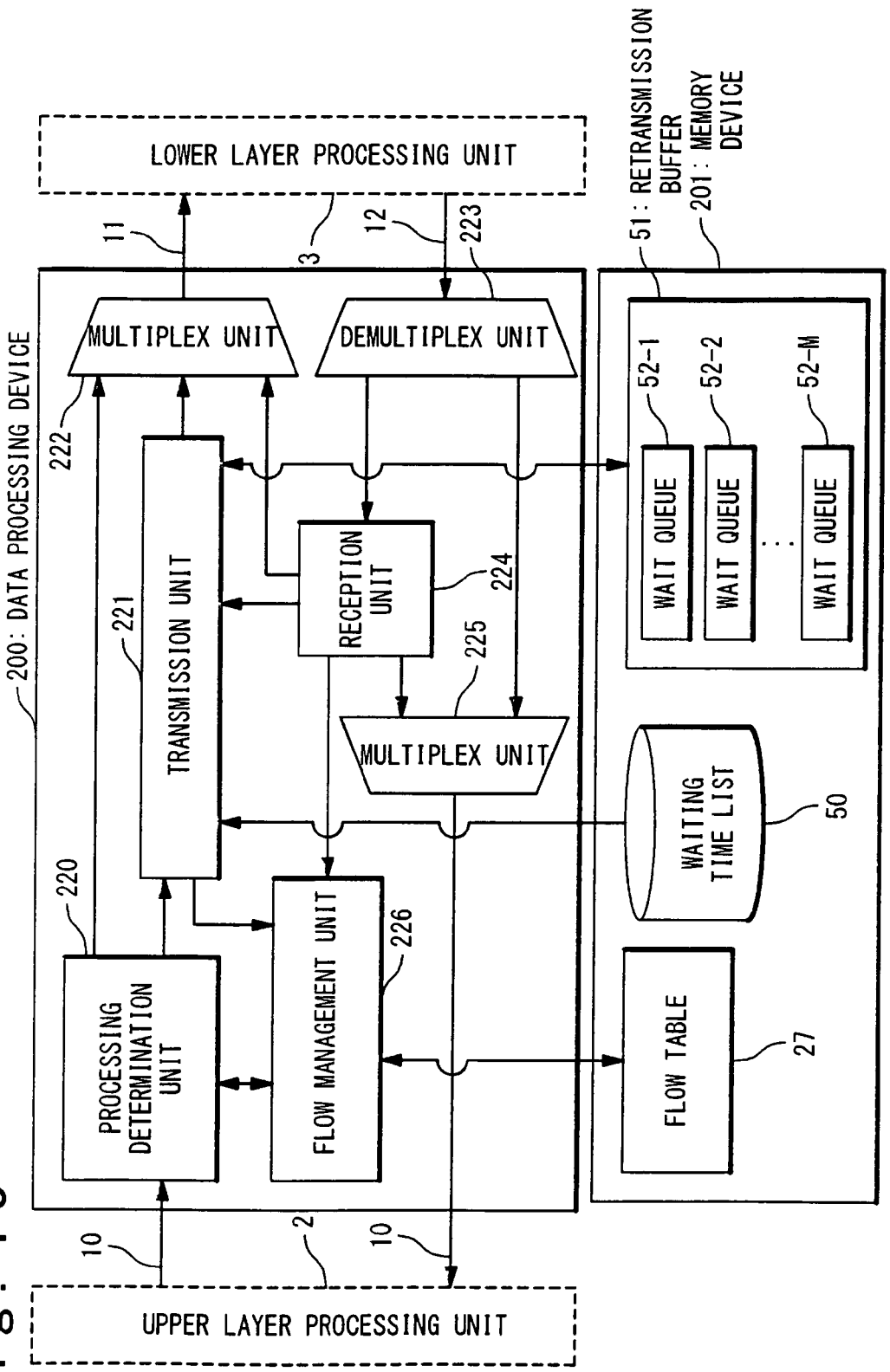

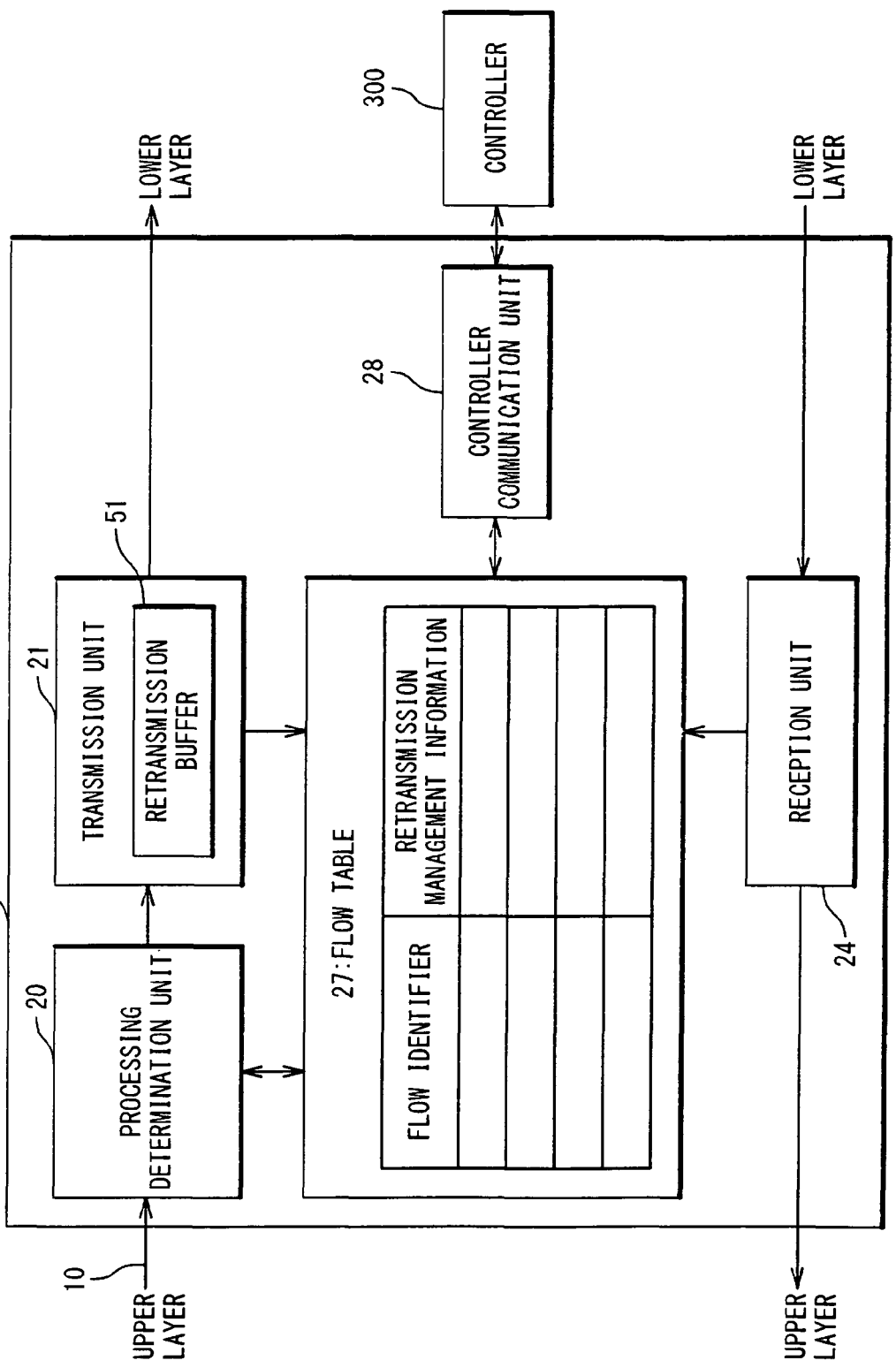

Fig. 17

27: FLOW TABLE

| Key | Value |
|---|---|
| 40: FLOW ENTRY | |
| 30 FLOW IDENTIFIER | 31 RTO / 32 RETRANSMISSION COUNT / 33 DELAY EXCESS COUNT / 41 LAST ACCESS TIME / 42 DELAY STATISTICS INFO. / 45 CONTROL MODE / 46 RTO SETTING |
| 40: FLOW ENTRY | |
| 30 FLOW IDENTIFIER | 31 RTO / 32 RETRANSMISSION COUNT / 33 DELAY EXCESS COUNT / 41 LAST ACCESS TIME / 42 DELAY STATISTICS INFO. / 45 CONTROL MODE / 46 RTO SETTING |
| ... | |
| 40: FLOW ENTRY | |
| 30 FLOW IDENTIFIER | 31 RTO / 32 RETRANSMISSION COUNT / 33 DELAY EXCESS COUNT / 41 LAST ACCESS TIME / 42 DELAY STATISTICS INFO. / 45 CONTROL MODE / 46 RTO SETTING |

PACKET RETRANSMISSION CONTROL DEVICE, PACKET RETRANSMISSION CONTROL METHOD, AND PACKET RETRANSMISSION CONTROL PROGRAM

CROSS-REFERENCE TO RELATED APPLICATION

This is a continuation of International Application No. PCT/JP2011/055072, filed on Mar. 4, 2011.

TECHNICAL FIELD

The present invention relates to packet retransmission control in packet communication.

BACKGROUND ART

In a packet communication network, a packet in transmission may be discarded or disrupted. This is caused by occurrence of congestion or reduction in signal receiver sensitivity in a router or a switch that forwards the packet, external electromagnetic noise, or the like. In general, the packet loss due to the discarding or disrupting is sensed by a protocol operating in an application layer or a transport layer. Then, on the basis of control by the protocol, the lost packet is retransmitted to ensure completeness of the transmission data.

More specifically, a transmitting device transmits a packet to a receiving device, and upon receipt of the packet, the receiving device sends an acknowledgement (ACK: ACKnowledgement) back to the transmitting device. Upon receipt of the acknowledgement, the transmitting device recognizes that the transmitted packet has reached the receiving device without any trouble. On the other hand, if a packet is lost in a network between the transmitting device and the receiving device, the transmitting device fails to receive an acknowledgement responding to the packet. In the case where the transmitting device fails to receive the acknowledgement within a predetermined waiting time after packet transmission, it retransmits the packet to the receiving device. Note that the above predetermined waiting time is referred to as a "retransmission time-out (RTO)". Also, the transmitting device that performs such packet retransmission control is provided with a memory region for temporarily storing a transmitted packet until it receives the corresponding acknowledgement. The memory region is hereinafter referred to as a "retransmission buffer".

The TCP (Transmission Control Protocol) used in the Internet is a typical transport layer protocol that performs such packet retransmission control.

A technique related to such packet retransmission control is described in Non-Patent Literature 1. According to the related technique, the packet retransmission control is performed in an MAC (Media Access Control) layer lower than the transport layer. The reason for this is as follows.

As an example, let us consider a network where a round-trip delay time (RTT) is very short, such as a network inside a data center. In such a network, by reducing a retransmission time-out to the order of microseconds, a waiting time for the packet retransmission can be reduced to improve communication efficiency. However, in general, the TCP is implemented in an OS (Operating System), and therefore it is difficult to reduce the retransmission time-out of the TCP to the order of microseconds. For example, accuracy of unit times (Jiffies) in Linux is at most milliseconds, and therefore not sufficient for time measurements in units of microseconds. For this reason, Non-Patent Literature 1 solves such the problem by performing the packet retransmission control in the MAC layer lower than the OS to reduce the retransmission time-out to the order of microseconds.

However, the related technique described in Non-Patent Literature has the following three problems.

A first problem is that a transmitting device does not have a means for detecting whether or not an opposite receiving device has a capability of retransmission control in a layer lower than the transport layer. For example, in a case where the transmitting device has the capability of retransmission control in the lower layer but the opposite receiving device does not have the capability, the receiving device does not send an acknowledgement in the lower layer back to the transmitting device. In this case, the transmitting device fails to receive the acknowledgement no matter how long it waits, so that the transmitting device erroneously recognizes that a packet is discarded on the way, and repeats retransmission in the lower layer. Traffic of such useless retransmission packets squeezes a transmission band, and thereby communication efficiency may be significantly reduced.

A second problem is that the retransmission time-out is constant regardless of a destination. For example, let us consider a case where one transmitting device communicates with two receiving devices "A" and "B", and round-trip delay times between the transmitting device and the receiving device "A" and between the transmitting device and the receiving device "B" are respectively 50 microseconds and 100 microseconds. In this case, an optimum retransmission time-out for the receiving device "A" is 50 microseconds, and an optimum retransmission time-out for the receiving device "B" is 100 microseconds. However, according to the above-mentioned related technique, the retransmission time-out is constant regardless of a destination, and therefore the retransmission time-out must be set to the longer one, i.e., 100 microseconds. Accordingly, if a packet is discarded between the transmitting device and the receiving device "A", the packet can be normally retransmitted in 50 microseconds; however, the transmitting device should wait for additional 50 microseconds. Such a redundant waiting time may also deteriorate the communication efficiency.

A third problem is that a transmitting device does not have a means for disabling the retransmission control if the round-trip delay time exceeds an allowable range. For example, let us consider a case where one transmitting device communicates with two receiving devices "A" and "C", and the round-trip delay times between the transmitting device and the receiving device "A" and between the transmitting device and the receiving device "C" are respectively 50 microseconds and 500 microseconds. Also, it is assumed that the transmitting device has a retransmission buffer that has a memory capacity enough to absorb the round-trip delay time up to 200 microseconds. In this case, the memory capacity of the retransmission buffer is obviously short as compared with the round-trip delay time between the transmitting device and the receiving device "C". For this reason, a situation may easily occur where the retransmission buffer overflows before the acknowledgement reaches the transmitting device from the receiving device "C" and thus the retransmission control does not work. Since the retransmission buffer is shared by all destinations, the retransmission control fails to work even for traffic to the receiving device "A" that is independent of the receiving device "C", if the retransmission buffer overflows.

CITATION LIST

Non Patent Literature

Non-Patent Literature 1: Toru Takamichi, et al., "Ultra-High Speed MAC Technology for Terabit-Class LAN", Proceedings of the IEICE Communications Society Conference (2008)

SUMMARY OF INVENTION

According to the above-described related technique, a malfunction such as a reduction in communication efficiency may occur in the case of performing the packet retransmission control in a lower layer.

An object of the present invention is to provide a technique that can prevent the malfunction that may occur in the case of performing the packet retransmission control in a lower layer.

In an aspect of the present invention, a packet retransmission control device that performs retransmission control for a packet inputted from an upper layer is provided. The packet retransmission control device has: a flow table and a processing determination unit. The flow table indicates, with respect to each of flows to which packets belong, retransmission management information for managing the retransmission control. The retransmission management information includes, as a retransmission management parameter, at least one of a packet retransmission count and a delay excess count. The delay excess count is a number of times that a round-trip delay time regarding a packet exceeds an allowable time. The round-trip delay time is a time from a transmission time of a packet to a reception time of an acknowledgement responding to the packet. The processing determination unit refers to the flow table to determine whether or not to apply the retransmission control to the packet. More specifically, the processing determination unit, when receiving a packet from the upper layer, refers to the flow table to obtain the retransmission management parameter associated with a flow to which the received packet belongs. If the retransmission management parameter is equal to or less than a threshold value, the processing determination unit determines to apply the retransmission control to the received packet. On the other hand, if the retransmission management parameter exceeds the threshold value, the processing determination unit stops application of the retransmission control to the received packet.

In another aspect of the present invention, a packet retransmission control method that performs retransmission control of a packet inputted from an upper layer is provided. The packet retransmission control method includes: (A) receiving a packet from the upper layer; and (B) determining, by referring to a flow table, whether or not to apply the retransmission control to the received packet. The flow table indicates, with respect to each of flows to which packets belong, retransmission management information for managing the retransmission control. The retransmission management information includes, as a retransmission management parameter, at least one of a packet retransmission count and a delay excess count. The delay excess count is a number of times that a round-trip delay time regarding a packet exceeds an allowable time. The round-trip delay time is a time from a transmission time of a packet to a reception time of an acknowledgement responding to the packet. The above-mentioned (B) determining whether or not to apply includes: (B1) obtaining the retransmission management parameter associated with a flow to which the received packet belongs; (B2) if the retransmission management parameter is equal to or less than a threshold value, determining to apply the retransmission control to the received packet; and (B3) if the retransmission management parameter exceeds the threshold value, stopping application of the retransmission control to the received packet.

In still another aspect of the present invention, a packet retransmission control program is provided. The packet retransmission control program causes a computer to execute a packet retransmission control Processing that performs retransmission control for a packet inputted from an upper layer. The packet retransmission control processing includes: (A) receiving a packet from the upper layer; and (B) determining, by referring to a flow table, whether or not to apply the retransmission control to the received packet. The flow table indicates, with respect to each of flows to which packets belong, retransmission management information for managing the retransmission control. The retransmission management information includes, as a retransmission management parameter, at least one of a packet retransmission count and a delay excess count. The delay excess count is a number of times that a round-trip delay time regarding a packet exceeds an allowable time. The round-trip delay time is a time from a transmission time of a packet to a reception time of an acknowledgement responding to the packet. The above-mentioned (B) determining whether or not to apply includes: (B1) obtaining the retransmission management parameter associated with a flow to which the received packet belongs; (B2) if the retransmission management parameter is equal to or less than a threshold value, determining to apply the retransmission control to the received packet; and (B3) if the retransmission management parameter exceeds the threshold value, stopping application of the retransmission control to the received packet.

According to the present invention, it is possible to prevent a malfunction that may occur in the case of performing the packet retransmission control in a lower layer.

BRIEF DESCRIPTION OF DRAWINGS

The above and other objects, advantages and features of the present invention will be more apparent from the following description of certain exemplary embodiments taken in conjunction with the accompanying drawings.

FIG. 4 is a conceptual diagram showing a flow table in the exemplary embodiment of the present invention.

FIG. 11B is the flow chart showing the processing at the time of packet transmission in the exemplary embodiment of the present invention.

FIG. 13A is a flow chart showing processing at the time of packet reception in the exemplary embodiment of the present invention.

FIG. 13B is the flow chart showing the processing at the time of packet reception in the exemplary embodiment of the present invention.

FIG. 14 is a flow chart showing processing at the time of cleanup in the exemplary embodiment of the present invention.

FIG. 15 is a diagram showing a configuration for the case where the retransmission control device according to the exemplary embodiment of the present invention is applied to an information processing device.

FIG. 16 is a block diagram showing a modification example of the exemplary embodiment of the present invention.

FIG. 17 is a conceptual diagram showing a flow table in the modification example of the present invention.

DESCRIPTION OF EMBODIMENTS

Exemplary embodiments of the present invention will be described below with reference to the attached drawings.

1. Outline

Figure 1:
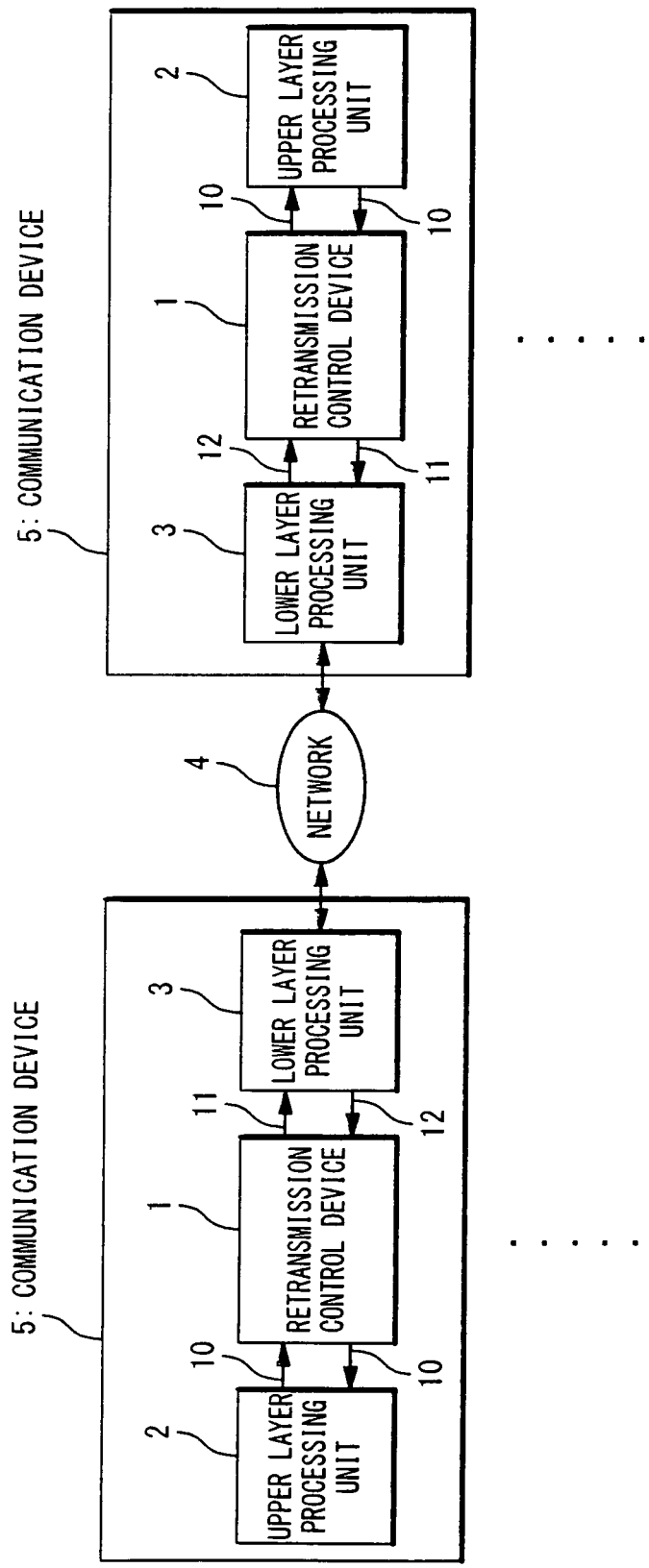
FIG. 1 is a block diagram showing a communication network system according to an exemplary embodiment of the present invention.

FIG. 1 shows a communication network system according to the present exemplary embodiment. The communication network system is provided with a network 4 and a plurality of communication devices 5. The plurality of communication devices 5 are connected to each other through the network 4.

The network 4 transfers a packet that is communicated between the plurality of communication devices 5. In the network 4, a plurality of transmission devices exemplified by a router and switch are mutually connected through transmission paths. The network 4 transfers a packet to an appropriate destination along a predetermined transfer path or according to destination information included in the packet. In the network 4, a packet being transferred may be lost due to a cause such as electromagnetic noise or traffic congestion.

Each of the communication devices 5 transmits/receives a packet to/from another communication device 5 through the network 4. Each of the communication devices 5 is provided with a retransmission control device 1, an upper layer processing unit 2 and a lower layer processing unit 3.

The upper layer processing unit 2 handles a transport layer or an application layer. A protocol of the transport layer is TCP, UDP (User Datagram Protocol), or the like. A protocol of the application layer is HTTP (Hyper Text Transfer Protocol), SMTP (Simple Mail Transfer Protocol), or the like. In the present exemplary embodiment, a packet generated or terminated by the upper layer processing unit 2 is referred to as a normal packet 10 to distinguish from the other types of packets.

The retransmission control device 1 receives the normal packet 10 from the upper layer processing unit 2. Then, the retransmission control device 1 performs retransmission control processing with respect to the normal packet 10 inputted from the upper layer processing unit 2, and transmits the processed packet 10 as a transmission packet 11 to the lower layer processing unit 3. Also, the retransmission control device 1 receives a reception packet 12 from the lower layer processing unit 3. If the reception packet 12 is an acknowledgement (ACK), the retransmission control device 1 terminates the acknowledgement. If the reception packet 12 includes a normal packet 10, the retransmission control device 1 transfers the normal packet 10 to the upper layer processing unit 2, and also generates an acknowledgement and sends it back to the transmission side. The retransmission control device 1 will be described later in detail.

The lower layer processing unit 3 handles a physical layer and a link layer. A protocol of the physical layer and the link layer is Ethernet, or the like. The lower layer processing unit 3 transmits the transmission packet 11 inputted from the retransmission control device 1 to the network 4 according to a predetermined procedure. Also, the lower layer processing unit 3 outputs a reception packet 12 received from the network 4 to the retransmission control device 1.

Figure 2:
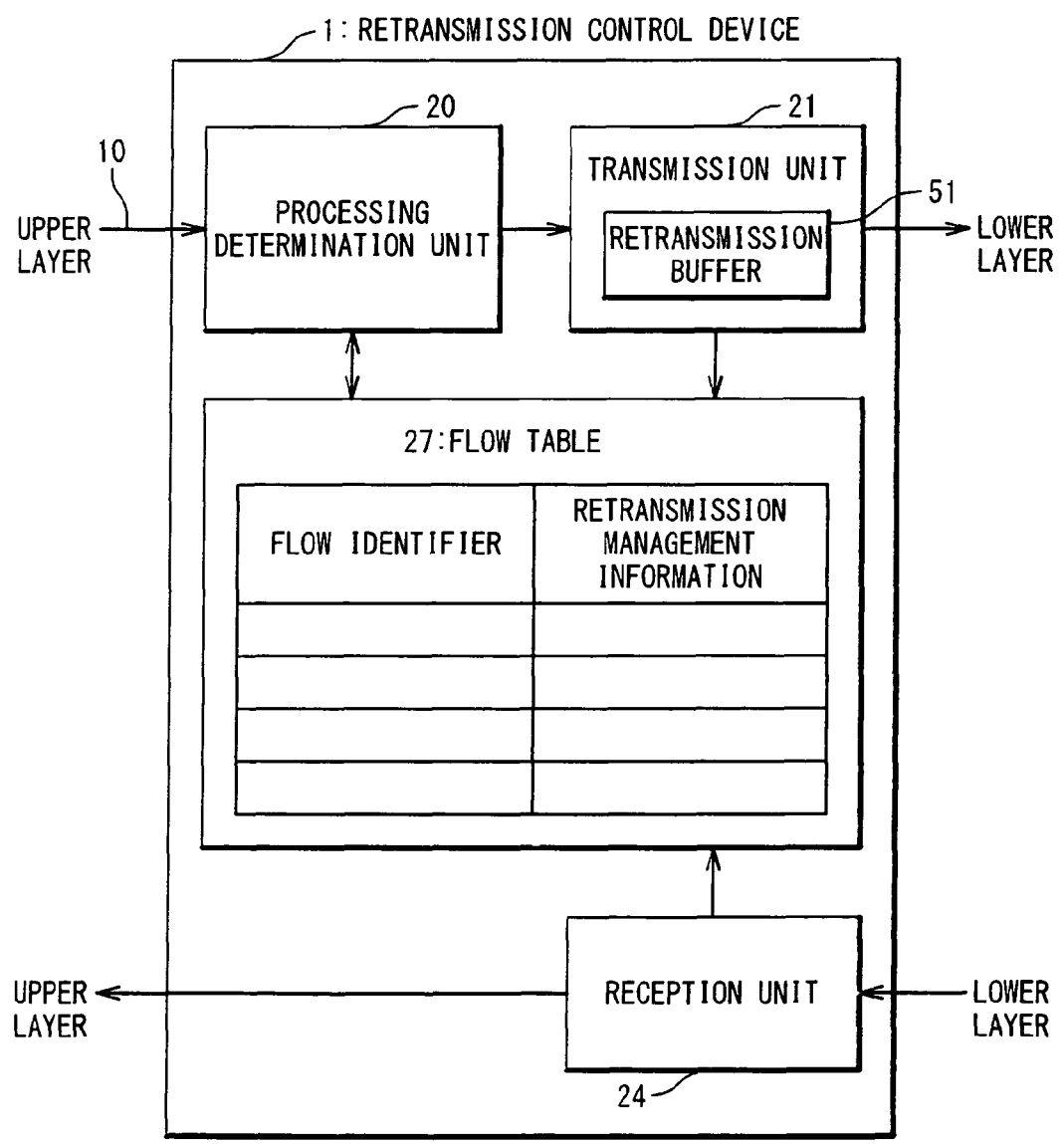
FIG. 2 is a block diagram showing an outline of a retransmission control device according to the exemplary embodiment of the present invention.

FIG. 2 is a block diagram showing an outline of the retransmission control device 1 according to the present exemplary embodiment. The retransmission control device 1 according to the present exemplary embodiment is provided with a processing determination unit 20, a transmission unit 21, a reception unit 24 and a flow table 27.

The flow table 27 indicates information associated with flows (communication flows) handled by the retransmission control device 1. More specifically, the flow table 27 indicates "retransmission management information" with respect to each of the flows. The flow is a collection of a series of packets. A unit of the flow is a communication device, user, link, carrier wave frequency, connection, session, application, or the like. Each of the flows can be identified by a flow identifier. The flow identifier is a part of or all of destination and source addresses, VLAN tag, and type of a MAC frame, source and destination addresses, protocol number, and TCP/UDP source and destination port numbers of an IP (Internet Protocol) packet, or the like.

The "retransmission management information" is information for managing the retransmission control processing by the retransmission control device 1. Examples of the retransmission management information include a packet retransmission count, a delay excess count, a retransmission time-out (RTO) and the like. The packet retransmission count is the number of times that a packet belonging to the corresponding flow is retransmitted. The delay excess count is the number of times that a round-trip delay time (RTT) regarding a packet belonging to the corresponding flow exceeds an allowable time. The round-trip delay time is a time from a transmission time of a packet to a reception time of an acknowledgement responding to the packet. According to the present exemplary embodiment, such the retransmission management information is managed separately with respect to each of the flows in the flow table 27.

The processing determination unit 20 receives a normal packet 10 from the upper layer processing unit 2. Upon receipt of the normal packet 10 from the upper layer processing unit 2, the processing determination unit 20 refers to the flow table 27 to determine whether or not to apply the retransmission control to the normal packet 10. More specifically, the processing determination unit 20 refers to the flow table 27 to obtain a "retransmission management parameter" associated with a flow to which the normal packet 10 belongs. In the present exemplary embodiment, the retransmission management parameter includes at least one of the above-described packet retransmission count and delay excess count.

If the retransmission management parameter is equal to or less than a threshold value, the processing determination unit 20 determines to apply the retransmission control to the normal packet 10. On the other hand, if the retransmission management parameter exceeds the threshold value, the processing determination unit 20 stops the application of the retransmission control to the normal packet 10.

As an example, let us consider a case where the retransmission management parameter is the packet retransmission count. Upon receipt of the normal packet 10 from the upper layer processing unit 2, the processing determination unit 20 refers to the flow table 27 to obtain the packet retransmission count associated with a flow to which the normal packet 10 belongs. If the packet retransmission count is equal to or less than a retransmission count threshold value, the processing determination unit 20 determines to apply the retransmission control to the normal packet 10. On the other hand, if the packet retransmission count exceeds the retransmission count threshold value, the processing determination unit 20 stops the application of the retransmission control to the normal packet 10. In this manner, if the retransmission count exceeds the predetermined threshold value, the retransmission control of subsequent packets belonging to the flow is disabled. Accordingly, such a situation where the packet retransmission is excessively repeated to reduce communication efficiency in the case where the opposite communication device 5 does not have the retransmission control capability can be prevented.

The transmission unit 21 receives, from the processing determination unit 20, the normal packet 10 to which the retransmission control is applied. Then, the transmission unit 21 stores the normal packet 10 in the retransmission buffer 51, and also outputs the normal packet 10 to the lower layer processing unit 3. The reception unit 24 receives a reception packet 12 from the lower layer processing unit 3. If the reception unit 24 fails to receive an acknowledgement responding to the normal packet 10 stored in the retransmission buffer 51 within the retransmission time-out, the transmission unit 21 performs retransmission processing. In the retransmission processing, the transmission unit 21 retransmits the normal packet 10 stored in the retransmission buffer 51 to the lower layer processing unit 3, and also increments the packet retransmission count associated with the flow to which the retransmission packet belongs in the flow table 27.

The retransmission management information in the flow table 27 may include the retransmission time-out. That is, the retransmission time-out may be set individually with respect to each of the flows. In this case, upon receipt of the normal packet 10 from the upper layer processing unit 2, the processing determination unit 20 refers to the flow table 27 to obtain the packet retransmission count and the retransmission time-out associated with a flow to which the normal packet 10 belongs. Then, the processing determination unit 20 outputs not only the normal packet 10 to which the retransmission control is applied but also the corresponding retransmission time-out to the transmission unit 21. The transmission unit 21 performs the retransmission processing on the basis of the retransmission time-out set for each of the flows. Since the retransmission time-out that is independent for each of the flows is used, the packet retransmission is efficiently performed even if the round-trip delay time is different depending on the flows. That is, it is possible to reduce a waiting time for the packet retransmission and thus to improve the communication efficiency.

As another example, let us consider a case where the retransmission management parameter is the delay excess count. Upon receipt of the normal packet 10 from the upper layer processing unit 2, the processing determination unit 20 refers to the flow table 27 to obtain the delay excess count associated with a flow to which the normal packet 10 belongs. If the delay excess count is equal to or less than an excess count threshold value, the processing determination unit 20 determines to apply the retransmission control to the normal packet 10. On the other hand, if the delay excess count exceeds the excess count threshold value, the processing determination unit 20 stops the application of the retransmission control to the normal packet 10. In this manner, if there exists a flow whose round-trip delay time (RTT) is too long and the delay excess count exceeds the predetermined threshold value, the retransmission control of subsequent packets belonging to the flow is disabled. Accordingly, such a situation where a malfunction of the retransmission control occurs due to overflow of the retransmission buffer in the case where the round-trip delay time exceeds a time that can be absorbed by the retransmission buffer can be prevented.

The reception unit 24 receives a reception packet 12 from the lower layer processing unit 3. If the reception packet 12 is an acknowledgement (ACK) responding to a normal packet 10 to which the retransmission control is applied, the reception unit 24 calculates the round-trip delay time (time from the transmission time of the normal packet 10 to the reception time of the acknowledgement) associated with the corresponding flow. If the calculated round-trip delay time exceeds an allowable time, the reception unit 24 increments the delay excess count associated with the flow in the flow table 27. Moreover, the reception unit 24 may update, based on the calculated round-trip delay time, the retransmission time-out associated with the flow in the flow table 27.

According to the present exemplary embodiment, as described above, it is possible to beforehand prevent the malfunction from occurring in the case of performing the packet retransmission control in the lower layer.

2. Configuration Example of Retransmission Control Device 1

2-1. Overall Configuration

Figure 3:
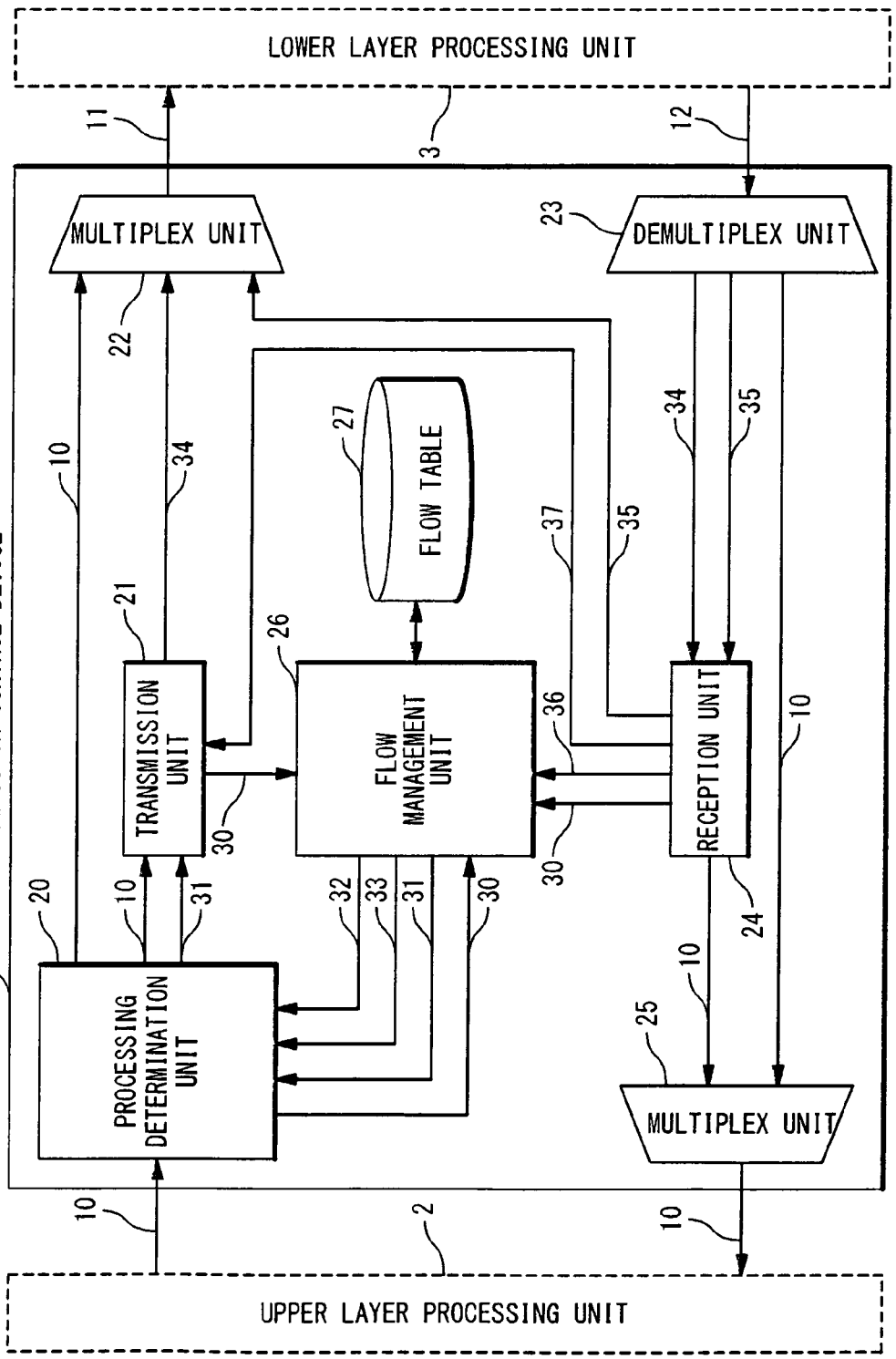
FIG. 3 is a block diagram showing a configuration of the retransmission control device according to the exemplary embodiment of the present invention.

FIG. 3 is a block diagram showing a configuration of the retransmission control device 1 according to the present exemplary embodiment. The retransmission control device 1 is provided with the processing determination unit 20, the transmission unit 21, the multiplex unit 22, the demultiplex unit 23, the reception unit 24, the multiplex unit 25, the flow management unit 26 and the flow table 27.

The processing determination unit 20 determines whether or not the retransmission control is applied to a normal packet 10 inputted from the upper layer processing unit 2. The processing determination unit 20 extracts information for identifying a flow from the normal packet 10 received from the upper layer processing unit 2, and outputs the information as a flow identifier 30 to the flow management unit 26.

The flow identifier 30 is a part of or all of destination and source addresses, VLAN tag, and type of a MAC frame, source and destination addresses, protocol number, and TCP/UD source and destination port numbers of an IP (Internet Protocol) packet, or the like.

The processing determination unit 20 receives a retransmission time-out 31, a retransmission count 32, a delay excess count 33 corresponding to the flow identifier 30 from the flow management unit 26. Then, the processing determination unit 20 determines whether or not the retransmission count 32 exceeds the predetermined retransmission count threshold value and whether or not the delay excess count 33 exceeds the predetermined excess count threshold value. If any of the retransmission count 32 and the delay excess count 33 exceeds the corresponding threshold value, the processing determination unit 20 determines that the normal packet 10 in processing is not to be applied with the retransmission control, and forwards the normal packet 10 to the multiplex unit 22. On the other hand, if neither the retransmission count 32 nor the delay excess count 33 exceeds the corresponding threshold values, the processing determination unit 20 determines that the normal packet 10 in processing is to be applied with the retransmission control, and outputs the normal packet 10 to the transmission unit 21 along with the retransmission time-out 31.

The transmission unit 21 performs transmission processing on the normal packet 10 that is to be applied with the retransmission control, and generates an encapsulated packet 34. The encapsulated packet 34 is a packet in which the normal packet 10 is provided with information necessary for the retransmission control. The transmission unit 21 will be described later in detail.

The multiplex unit 22 multiplexes the normal packet 10 received from the processing determination unit 20, the encapsulated packet 34 received from the transmission unit 21 and an ACK (acknowledgement) packet 35 received from the reception unit 24 on a packet-by-packet basis to output the resultant as a transmission packet 11 to the lower layer processing unit 3. Note that the encapsulated packet 34 and the ACK packet 35 are packets that are generated or terminated by the retransmission control device 1.

The demultiplex unit 23 receives a reception packet 12 from the lower layer processing unit 3. The demultiplex unit 23 sorts the reception packet 12 into the reception unit 24 or the multiplex unit 25 depending on the type of the reception packet 12. More specifically, if the reception packet 12 is a normal packet 10, the demultiplex unit 23 outputs the reception packet 12 to the multiplex unit 25. On the other hand, if the reception packet 12 is an encapsulated packet 34 or an ACK packet 35, the demultiplex unit 23 outputs the reception packet 12 to the reception unit 24.

The reception unit 24 terminates the encapsulated packet 34 and the ACK packet 35 received from the demultiplex unit 23. Also, the reception unit 24 outputs a normal packet 10 extracted from the encapsulated packet 34 to the multiplex unit 25, and also generates an ACK packet 35 and outputs the ACK packet 35 to the multiplex unit 22. The reception unit 24 will be described later in detail.

The multiplex unit 25 multiplexes the normal packet 10 received from the demultiplex unit 23 and the reception unit 24 on a packet-by-packet basis to output the resultant to the upper layer processing unit 2.

The flow management unit 26 manages the flow table 27. The flow management unit 26 accesses the flow table 27 upon request of the processing determination unit 20, the transmission unit 21, or the reception unit 24. The flow management unit 26 will be described later in detail.

2-2. Flow Management Unit 26 and Flow Table 27

2-2-1. Flow Table 27

FIG. 4 conceptually shows the flow table 27 in the present exemplary embodiment. The flow table 27 has zero or more flow entries 40. Each of the flow entries 40 is associated with each flow communicated by the retransmission control device 1, and indicates information on the corresponding flow. More specifically, each of the flow entries 40 includes a flow identifier 30, a retransmission time-out 31, a retransmission count 32, a delay excess count 33, a last access time 41 and delay statistics information 42. These pieces of information represent retransmission management information.

The retransmission time-out 31 is a lower limit value of the retransmission time-out applied to the normal packet 10 belonging to the corresponding flow. For example, if the retransmission time-out 31 of some flow entry 40 is 49.123 microseconds, the retransmission time-out actually applied to the normal packet 10 belonging to a flow corresponding to the flow entry 40 is "equal to or more than" 49.123 microseconds. The reason why the actual retransmission time-out is not necessarily "just" 49.123 microseconds is that the number of after-mentioned wait queues 52 in the retransmission buffer 51 is finite, and therefore the actual retransmission time-out is discrete.

The retransmission count 32 is a cumulative total of the number of times that the normal packet 10 belonging to the corresponding flow is retransmitted.

The delay excess count 33 is a cumulative total of the number of times that a round-trip delay time 36 exceeds a predetermined threshold value. The round-trip delay time 36 is a difference between a transmission time of an encapsulated packet 34 belonging to the flow and a reception time of the corresponding ACK packet 35. In order to avoid overflow of the retransmission buffer 51, the predetermined threshold value is preferably equal to or less than the round-trip delay time allowable by the retransmission buffer 51.

The last access time 41 is a time at which the flow management unit 26 last accesses the corresponding flow entry 40. This access includes both of a reference operation and an update operation on the flow entry 40. Exceptionally, during performing after-mentioned cleanup of the flow table 27, the last access time 41 is not updated. The last access time 41 is used when the flow entry 40 not accessed for a long time is deleted from the flow table 27.

The delay statistics information 42 includes statistics information on the round-trip delay time 36. The delay statistics information 42 includes a history, mean value, deviation, dispersion, and the like of the round-trip delay time 36, and is referred to/updated when the retransmission time-out 31 is calculated. Pieces of information included in the delay statistics information 42 are determined by an algorithm for calculating the retransmission time-out 31. For example, the IETF RFC2988 "Computing TCP's Retransmission Timer" standard that is a retransmission time-out calculation algorithm for TCP uses a mean value and mean deviation of the round-trip delay time 36 when the retransmission time-out is calculated. Accordingly, for example, in the case of employing this algorithm, the delay statistics information 42 includes the mean value and mean deviation of the round-trip delay time 36.

2-2-2. Flow Management Unit 26

The flow management unit 26 interfaces with the processing determination unit 20, the transmission unit 21 and the reception unit 24. Also, the flow management unit 26 regularly cleans up the flow table 27.

<Interface with Processing Determination Unit 20>

Upon receipt of the flow identifier 30 from the processing determination unit 20, the flow management unit 26 sequentially performs the following two processing.

The first processing is to search the flow table 27 to output a part of contents of a flow entry 40 corresponding to the flow identifier 30 to the processing determination unit 20. More specifically, the flow management unit 26 searches the flow table 27 to determine whether or not a flow entry 40 having the same flow identifier 30 as the flow identifier 30 received from the processing determination unit 20 is present in the flow table 27. If the search results in success, the flow management unit 26 outputs the retransmission time-out 31, the retransmission count 32 and the delay excess count 33 of the flow entry 40 to the processing determination unit 20.

On the other hand, if the search results in fail, the flow management unit 26 adds a new flow entry 40 corresponding to the flow identifier 30 received from the processing determination unit 20 to the flow table 27. At this time, the flow management unit 26 initializes contents of the new flow entry 40. Initial values of the retransmission count 32 and the delay excess count 33 are respectively zeros. An initial value of the retransmission time-out 31 is preferably equal to or less than the round-trip delay time allowable by the retransmission buffer 51. The delay statistics information 42 is appropriately initialized according to the algorithm for calculating the retransmission time-out 31. Subsequently, the flow management unit 26 outputs the retransmission time-out 31, the retransmission count 32 and the delay excess count 33 of the new flow entry 40 to the processing determination unit 20.

The second processing is to subtract a predetermined value from the retransmission count 32 of the flow entry 40 corresponding to the flow identifier 30 received from the processing determination unit 20, and also to subtract a predetermined value from the delay excess count 33 of the flow entry 40. For example, the flow management unit 26 subtracts 0.2 from the retransmission count 32, and 0.1 from the delay excess count 33. If any of the resultant values becomes negative as a result of the subtractions, the subtraction result is corrected to zero. Note that if the retransmission count 32 exceeds a predetermined threshold value or the delay excess count 33 exceeds a predetermined threshold value, such the subtraction processing is not performed. These predetermined threshold values are the same as those in the processing determination unit 20.

An object of the second processing is as follows: It is considered that if accidental packet loss or excess of a round-trip delay time is repeated, the retransmission count 32 and the delay excess count 33 of a flow that is supposed to be applied with the retransmission control eventually exceed the corresponding threshold values, and thereby the retransmission control of the flow becomes erroneously inapplicable. To prevent such a situation, every time the normal packet 10 is inputted to the retransmission control device 1 from the upper layer processing unit 2, the retransmission count 32 and the delay excess count 33 of a flow entry 40 corresponding to a flow to which the normal packet 10 belongs are reduced.

<Interface with Transmission Unit 21>

Upon receipt of the flow identifier 30 from the transmission unit 21, the flow management unit 26 searches the flow table 27 to determine whether or not a flow entry 40 having the same flow identifier 30 as the flow identifier 30 is present in the flow table 27. If the search results in fail, the flow management unit 26 does not do anything. If the search results in success, the flow management unit 26 increments the retransmission count 32 of the corresponding flow entry 40 by one.

<Interface with Reception Unit 24>

Upon receipt of the flow identifier 30 and the round-trip delay time 36 from the reception unit 24, the flow management unit 26 searches the flow table 27 to determine whether or not a flow entry 40 having the same flow identifier 30 as the flow identifier 30 is present in the flow table 27. If the search results in fail, the flow management unit 26 does not do anything. If the search results in success, the flow management unit 26 performs the following two processing.

A first processing is to use the round-trip delay time 36 to update the retransmission time-out 31 of the flow entry 40. At this time, the delay statistics information 42 of the flow entry 40 may be referred to/updated as necessary. Methods for estimating the appropriate retransmission time-out 31 from the round-trip delay time 36 and the delay statistics information 42 include the previously cited IETF RFC2988 "Computing TCP's Retransmission Timer", and the like.

A second method is to increment the delay excess count 33 of the flow entry 40 by one, if the round-trip delay time 36 exceeds a round-trip delay time allowable by the retransmission buffer 51.

<Cleanup of Flow Table 27>

The flow management unit 26 regularly cleans up the flow table 27. More specifically, the flow management unit 26 performs the following two processing with respect to each of all flow entries 40 of the flow table 27.

A first processing is to calculate an idle time from a difference between the last access time 41 to the flow entry 40 and the current time, and to delete the flow entry 40 from the flow table 27 if the idle time exceeds a predetermined threshold value.

An object of the first processing is to delete a flow entry 40 not accessed for a long time from the flow table 27, and to ensure an empty space in the flow table 27.

A second processing is to subtract a predetermined value from the retransmission count 32 of the flow entry 40, and also to subtract a predetermined value from the delay excess count 33 of the flow entry 40. If any of the resultant values becomes negative as a result of the subtractions, the subtraction result is corrected to zero. However, if the retransmission count 32 exceeds a predetermined threshold value or the delay excess count 33 exceeds a predetermined value, such the subtraction processing is not performed. These predetermined threshold values are the same as those in the processing determination unit 20.

An object of the second processing is as follows: It is considered that if accidental packet loss or excess of a round-trip delay time is repeated, the retransmission count 32 and the delay excess count 33 of a flow that is supposed to be applied with the retransmission control eventually exceed the corresponding threshold values, and thereby the retransmission control of the flow becomes erroneously inapplicable. To prevent such a situation, the retransmission count 32 and the delay excess count 33 of each of the flow entries 40 are reduced as time passes.

2-3. Transmission Unit 21

Figure 5:
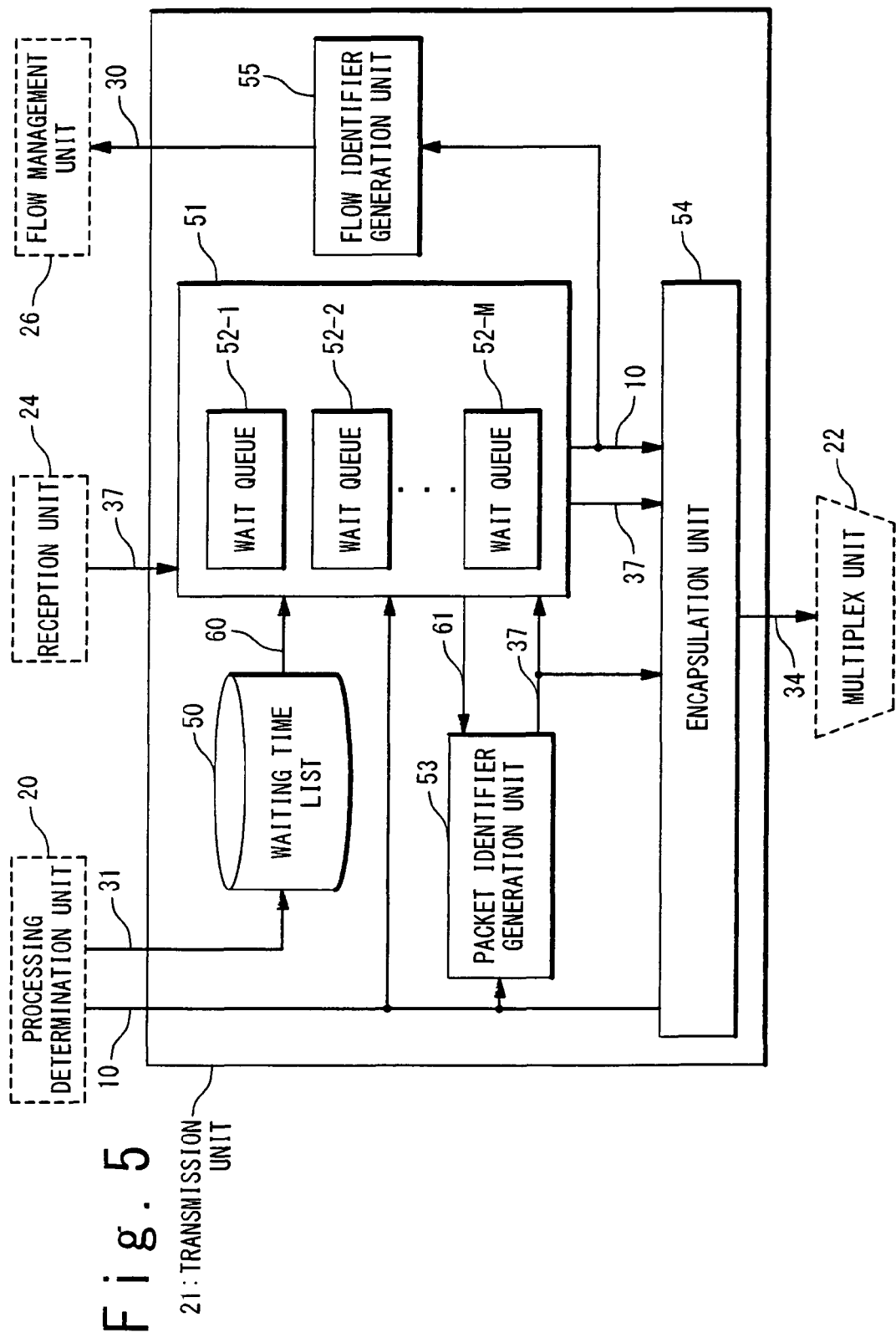
FIG. 5 is a block diagram showing a configuration of a transmission unit in the exemplary embodiment of the present invention.

FIG. 5 shows a configuration example of the transmission unit 21 of the retransmission control device 1. The transmission unit 21 is provided with a waiting time list 50, a retransmission buffer 51, a packet identifier generation unit 53, an encapsulation unit 54 and a flow identifier generation unit 55. The retransmission buffer 51 is provided with M (M is a natural number) wait queues 52-1 to 52-M.

2-3-1. Waiting Time List 50

Figure 6:
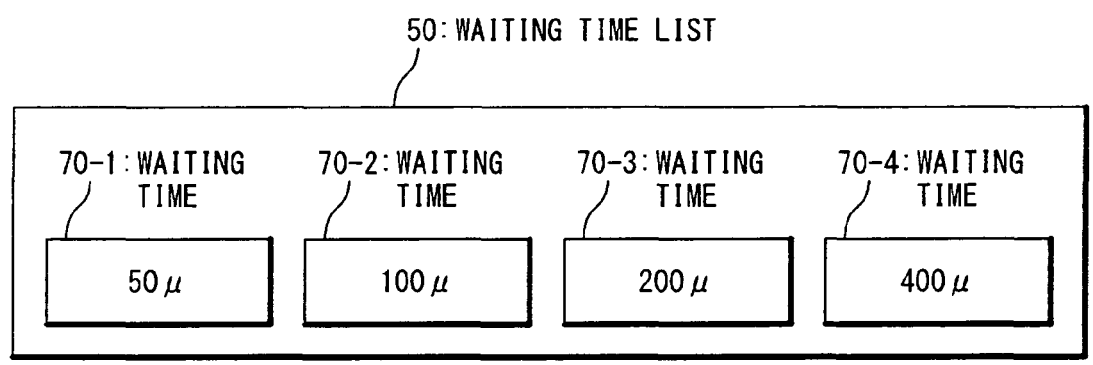
FIG. 6 is a conceptual diagram showing an example of a waiting time list in the exemplary embodiment of the present invention.

FIG. 6 shows an example of the waiting time list 50. The waiting time list 50 indicates respective waiting times 70-1 to 70-M of the wait queues 52-1 to 52-M. The waiting time 70-X ($1 \leq X \leq M$) in the waiting time list 50 is a waiting time of an X-th wait queue 52-X in the retransmission buffer 51. The waiting time 70 is different for each wait queue 52.

Upon receipt of the normal packet 10 and the retransmission time-out 31 from the processing determination unit 20, the transmission unit 21 refers to the waiting time list 50 to select a minimum waiting time 70-Y ($1 \leq Y \leq M$) that meets a relationship of "waiting time 70-Y$\geq$retransmission time-out 31". The selected Y is defined as a wait queue number 60.

The wait queue number 60 specifies a wait queue 52 that serves as a storage destination of the normal packet 10 inputted from the processing determination unit 20. That is, the normal packet 10 is stored in the Y-th wait queue 52-Y in the retransmission buffer 51. In other words, the normal packet 10 is stored in the wait queue 52-Y that is appropriate depending on the retransmission time-out 31 set for each flow.

For example, let us consider a case where the retransmission time-out 31 inputted from the processing determination unit 20 is 111 microseconds. In this case, according to the waiting time list 50 shown in FIG. 6, the wait queue number is "3". Accordingly, the normal packet 10 inputted from the processing determination unit 20 is stored in the wait queue 52-3.

2-3-2. Retransmission buffer 51

The retransmission buffer 51 is a storage region for temporarily storing the normal packet 10 until the retransmission control device 1 receives the corresponding ACK packet 35. The retransmission buffer 51 includes the M (M is a natural number) physical or logical wait queues 52-1 to 52-M.

Figure 7:
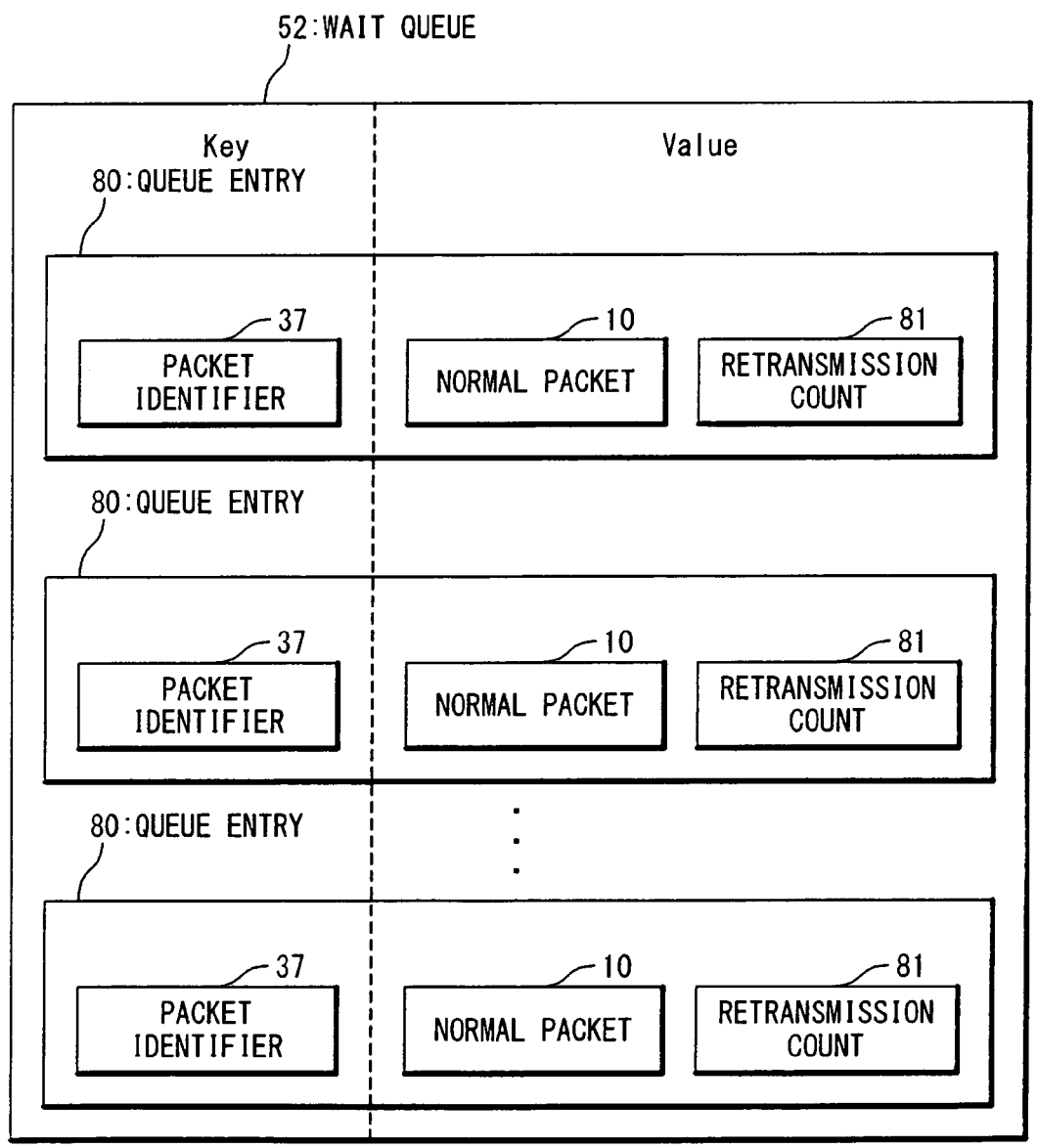
FIG. 7 is a conceptual diagram showing a configuration of a wait queue in the exemplary embodiment of the present invention.

FIG. 7 shows a configuration example of the wait queue 52. The wait queue 52 is a FIFO (First-In First-Out) type queue having zero or more queue entries 80. The wait queue 52-X ($1 \leq X \leq M$) keeps a queue entry 80 added thereto waiting only for a waiting time 70-X. The foremost queue entry 80 of the wait queue 52 is the oldest, and the rearmost queue entry 80 is the newest.

The respective queue entries 80 of the wait queue 52 are associated with the normal packets 10 inputted to the retransmission control device 1 from the upper layer processing unit 2 one by one, and indicate information on the corresponding normal packets, respectively. More specifically, each of the queue entries 80 includes a packet identifier 37, the normal packet 10 and a retransmission count 81.

The packet identifier 37 is information for identifying the normal packet 10 inputted to the retransmission control device 1 from the upper layer processing unit 2. The packet identifier 37 is a part of or all of a sequence number, an address 61, a flow identifier 30 and the like of TCP, for example. The address 61 is a memory address of the wait queue 52 that stores the queue entry 80 corresponding to the normal packet 10.

The normal packet 10 in the queue entry 80 is one that is to be applied with the retransmission control, among normal packets 10 inputted to the retransmission control device 1 from the upper layer processing unit 2.

The retransmission count 81 in the queue entry 80 is a cumulative total of the number of times that the encapsulated packet 34 including the normal packet in the queue entry 80 is retransmitted.

When a wait queue number 60 is determined, the transmission unit 21 adds a new queue entry 80 to the wait queue 52-Y (Y is the wait queue number). At this time, content of the new queue entry 80 is not configured. Then, a memory address of the wait queue 52-Y in which the new queue entry 80 is stored is informed as an address 61 to the packet identifier generation unit 53. When the packet identifier 37 is generated by the packet identifier generation unit 53, the transmission unit 21 registers the packet identifier 37 and the normal packet 10 in processing in the new queue entry 80. Also, the transmission unit 21 initializes the retransmission count 81 of the new queue entry 80 to one.

The transmission unit 21 performs the following processing (i.e., retransmission) on the queue entry 80 in which a waiting time 70-X ($1 \leq X \leq M$) has passed since the queue entry 80 was added to the wait queue 52-X. The transmission unit 21 outputs the packet identifier 37 and the normal packet 10 of the queue entry 80 to the encapsulation unit 54. Then, the transmission unit 21 determines whether or not the retransmission count 81 in the queue entry 80 reaches a predetermined upper limit count. If the retransmission count 81 reaches the predetermined upper limit count, the transmission unit 21 deletes the queue entry 80 from the wait queue 52-X. If the retransmission count 81 does not reach the predetermined upper limit count, the transmission unit 21 moves the queue entry 80 to the rearmost part of the wait queue 52-X. This operation is equivalent to deleting the queue entry 80 once and then adding it again. In order to record the fact of the retransmission, the transmission unit 21 increments the retransmission count 81 in the moved queue entry 80 by one.

Also, upon receipt of the packet identifier 37 from the reception unit 24, the transmission unit 21 performs the following processing. That is, the transmission unit 21 deletes a queue entry 80 having the same packet identifier 37 as the packet identifier 37 from the wait queues 52-1 to 52-M. If such a queue entry 80 is not present in the wait queues 52-1 to 52-M, the transmission unit 21 does not do anything.

2-3-3. Packet Identifier Generation Unit 53

The packet identifier generation unit 53 generates the packet identifier 37 on the basis of the normal packet 10 inputted from the processing determination unit 20 and the address 61 received from the retransmission buffer 51. Then, the packet identifier generation unit 53 outputs the packet identifier 37 to the retransmission buffer 51 and the encapsulation unit 54.

2-3-4. Encapsulation Unit 54

The encapsulation unit 54 generates the encapsulated packet 34 on the basis of the normal packet 10 received from the processing determination unit 20 or retransmission buffer 51 (at the time of retransmission) and the packet identifier 37 received from the packet identifier generation unit 53. Then, the encapsulation unit 54 outputs the generated encapsulated packet 34 to the multiplex unit 22.

Figure 8:
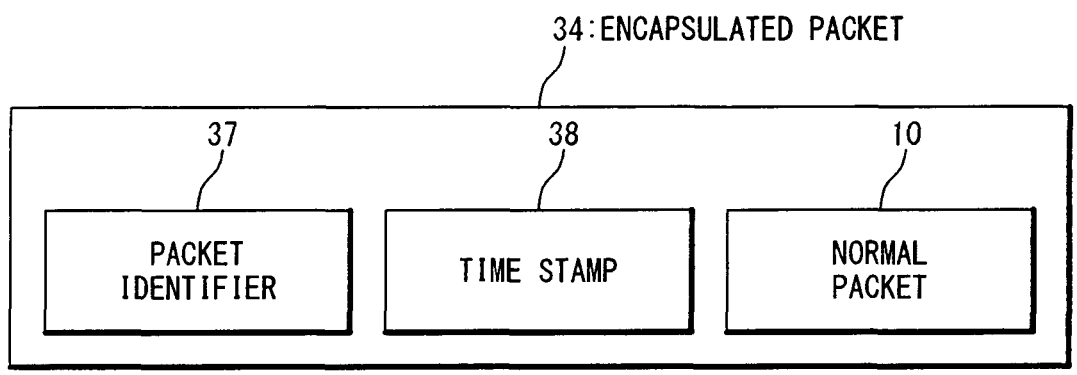
FIG. 8 shows an example of a format of an encapsulated packet in the exemplary embodiment of the present invention.

FIG. 8 shows an example of a format of the encapsulate packet 34. The encapsulated packet 34 includes the packet identifier 37, a time stamp 38 and the normal packet 10. The packet identifier 37 is one that is received from the packet identifier generation unit 53. The normal packet 10 is one that is received from the processing determination unit 20 or the retransmission buffer 51 (at the time of retransmission). A current time is substituted into the time stamp 38. The time stamp 38 is used to measure the round-trip delay time 36.

Note that if the generated encapsulated packet 34 includes redundant information, it is preferable from the perspective of communication efficiency to omit the redundant information to shorten a length of the encapsulated packet 34. For example, if the upper layer processing unit 2 includes a time stamp in the normal packet 10, the time stamp 38 in the encapsulated packet 34 may be omitted. Also, if information on source and destination addresses of the normal packet 10 in the encapsulated packet 34 is included in the packet identifier 37, the information in the packet identifier 37 may be omitted.

2-3-5. Flow Identifier Generation Unit 55

Upon receipt of the normal packet 10 from the retransmission buffer 51, the flow identifier generation unit 55 extracts the flow identifier 30 from the normal packet 10. Then, the flow identifier generation unit 55 outputs the flow identifier 30 to the flow management unit 26. The flow identifier 30 is used to increment the retransmission count 32 in the corresponding flow entry 40.

2-4. Reception Unit 24

Figure 9:
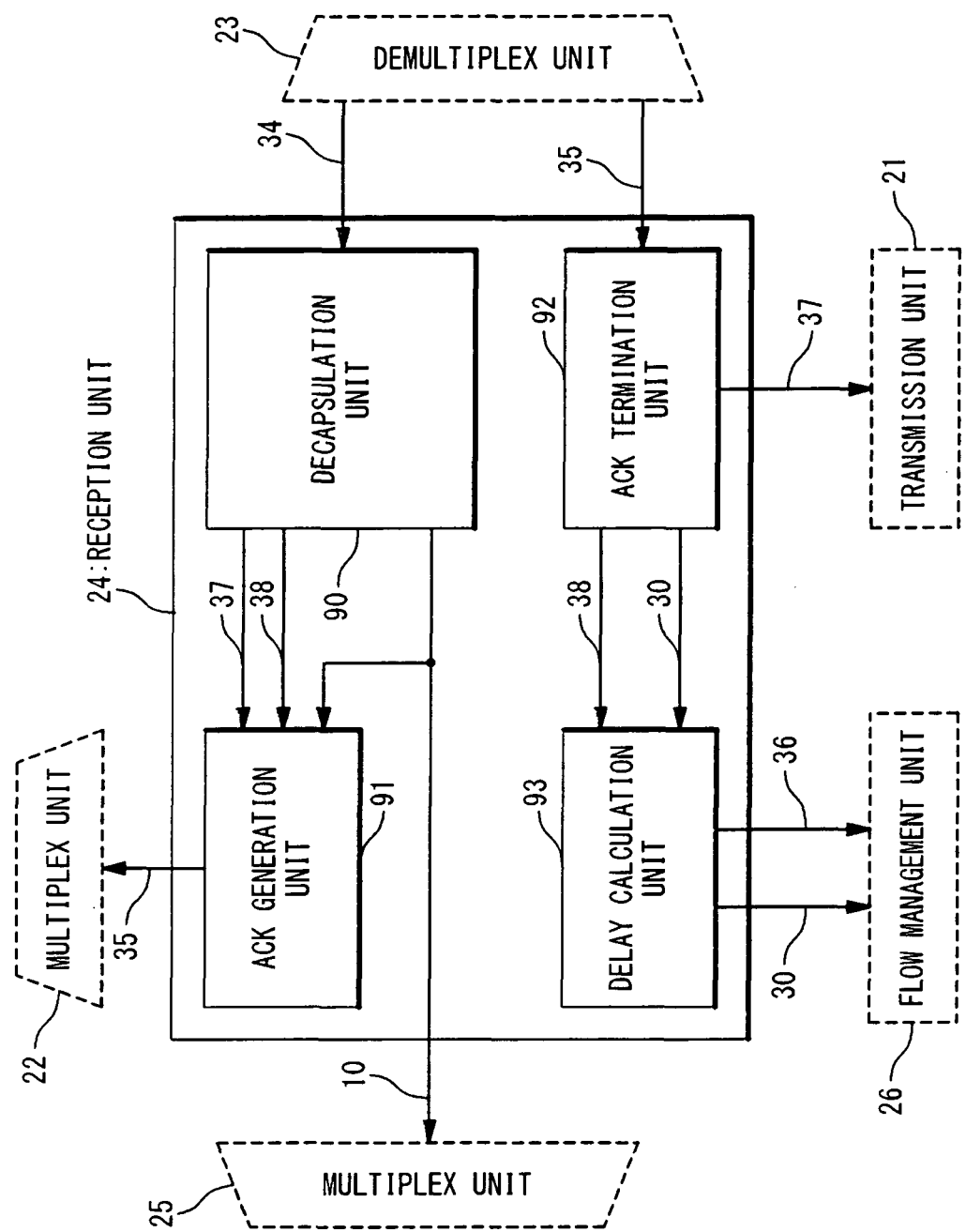
FIG. 9 is a diagram showing a configuration of a reception unit in the exemplary embodiment of the present invention.

FIG. 9 shows a configuration example of the reception unit 24 of the retransmission control device 1. The reception unit 24 is provided with a decapsulation unit 90, an ACK generation unit 91, an ACK termination unit 92 and a delay calculation unit 93.

2-4-1. Decapsulation Unit 90

The decapsulation unit 90 receives an encapsulated packet 34 from the demultiplex unit 23. The decapsulation unit 90 extracts the packet identifier 37, the time stamp 38 and the normal packet 10 from the received encapsulated packet 34. Then, the decapsulation unit 90 outputs the normal packet 10 to the multiplex unit 25. Also, the decapsulation unit 90 outputs the packet identifier 37, the time stamp 38 and the normal packet 10 to the ACK generation unit 91.

2-4-2. ACK Generation Unit 91

The ACK generation unit 91 generates an ACK packet 35 on the basis of the information received from the decapsulation unit 90, and outputs the ACK packet 35 to the multiplex unit 22. More specifically, upon receipt of the packet identifier 37, the time stamp 38 and the normal packet 10 from the decapsulation unit 90, the ACK generation unit 91 sequentially performs the following two processing.

A first processing is to extract, from the normal packet 10, information for identifying a flow, i.e., the flow identifier 30.

A second processing is to generate the ACK packet 35 on the basis of the flow identifier 30, the packet identifier 37 and the time stamp 38, and outputs the ACK packet 35 to the multiplex unit 22.

Figure 10:
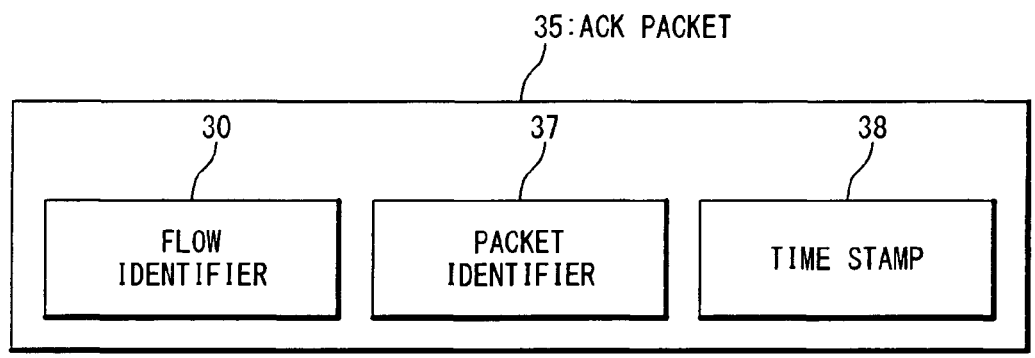
FIG. 10 shows an example of a format of an ACK packet in the exemplary embodiment of the present invention.

FIG. 10 shows an example of a format of the ACK packet 35. The ACK packet 35 includes the flow identifier 30, the packet identifier 37 and the time stamp 38. The flow identifier 30 is one that was extracted by the first processing. As the packet identifier 37 and the time stamp 38, the packet identifier 37 and the time stamp 38 received from the decapsulation unit 90 are respectively used.

Note that, if the generated ACK packet 35 includes redundant information, it is preferable from the perspective of communication efficiency to omit the redundant information to shorten a length of the ACK packet 35. For example, if both of the flow identifier 30 and packet identifier 37 in the ACK packet 35 include information on source and destination addresses, the information in any one of them may be omitted.

2-4-3. ACK Termination Unit 92

The ACK termination unit 92 receives an ACK packet 35 from the demultiplex unit 23. The ACK termination unit 92 extracts the flow identifier 30, the packet identifier 37 and the time stamp 38 from the received ACK packet 35. Then, the ACK termination unit 92 outputs the packet identifier 37 to the transmission unit 21. The packet identifier 37 transmitted to the transmission unit 21 is used to delete a corresponding queue entry 80 from the wait queue 52. Also, the ACK termination unit 92 outputs the flow identifier 30 and the time stamp 38 to the delay calculation unit 93.

2-4-4. Delay Calculation Unit 93

Upon receipt of the flow identifier 30 and the time stamp 38 from the ACK termination unit 92, the delay calculation unit 93 calculates a round-trip delay time 36 from a difference between the time stamp 38 and the current time. Then, the delay calculation unit 93 outputs the round-trip delay time 36 and the flow identifier 30 to the flow management unit 26.

3. Processing Flow 3-1. Processing Flow Upon Packet Transmission

Figure 11A:
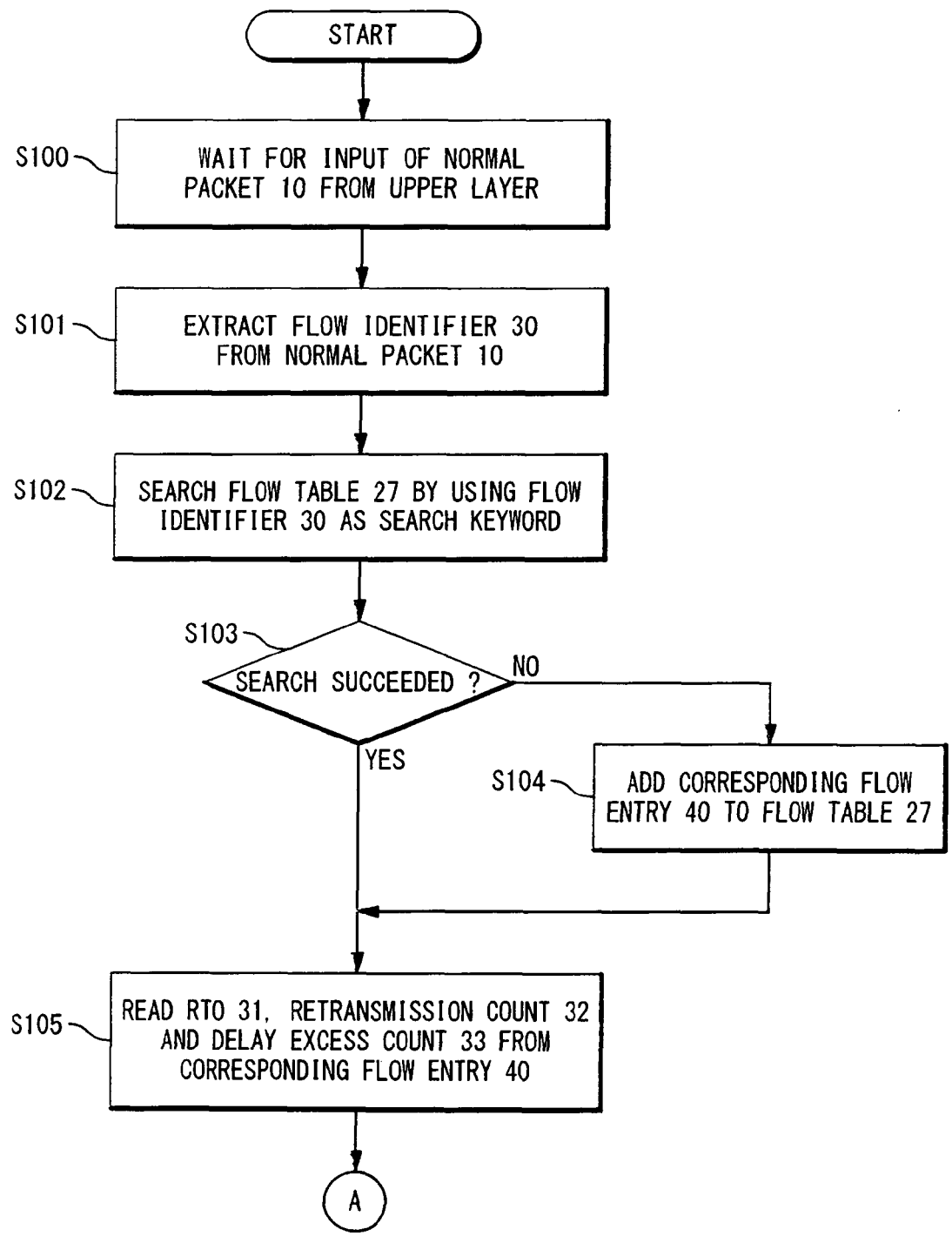
FIG. 11A is a flow chart showing processing at the time of packet transmission in the exemplary embodiment of the present invention.

FIGS. 11A and 11B show a flow chart at the time when the retransmission control device 1 transmits a normal packet 10 inputted from the upper layer processing unit 2 to the lower layer processing unit 3.

The retransmission control device 1 waits for input of a normal packet 10 from the upper layer processing unit 2 (Step S100).

The processing determination unit 20 extracts the flow identifier 30 from the normal packet 10 inputted in Step S100 (Step S101). The flow management unit 26 searches the flow table 27 to determine whether or not a flow entry 40 having the same flow identifier 30 as the flow identifier 30 extracted in Step S101 is present in the flow table 27 (Step S102). If it is present (Step S103; Yes), the processing proceeds to Step S105, whereas if it is not present (Step S103; No), the processing proceeds to Step S104.

In Step S104, the flow management unit 26 adds a new flow entry 40 corresponding to the flow identifier 30 extracted in Step S101 to the flow table 27. At this time, the flow management unit 26 initializes content of the new flow entry 40. Then, the processing proceeds to Step S105.

In Step S105, the flow management unit 26 reads the retransmission time-out 31, the retransmission count 32 and the delay excess count 33 from the flow entry 40 corresponding to the flow identifier 30 extracted in Step S101. Subsequently, the processing determination unit 20 compares the retransmission count 32 and the delay excess count 33 with corresponding predetermined threshold values, respectively, to determine whether or not the retransmission control should be applied to the normal packet 10 in processing (Step S106).

If any of the retransmission count 32 and the delay excess count 33 exceeds the corresponding threshold value (Step S106; Yes), the normal packet 10 in processing is not to be applied with the retransmission control. In this case, the processing proceeds to Step S107. In Step S107, the processing determination unit 20 outputs the normal packet 10 to the lower layer processing unit 3 through the multiplex unit 22. Step S107 is one of final steps.

On the other hand, if neither the retransmission count 32 nor delay excess count 33 exceeds the corresponding threshold values (Step S106; No), the normal packet 10 in processing is to be applied with the retransmission control. In this case, the processing proceeds to Step S108. In Step S108, the flow management unit 26 subtracts predetermined values from the retransmission count 32 and delay excess count 33 in the flow entry 40 corresponding to the flow identifier 30 extracted in Step S101, respectively. If any of the resultant values becomes negative as a result of the subtractions, the subtraction result is corrected to zero.

Also, the transmission unit 21 refers to the waiting time list 50 to select a minimum waiting time 70-Y that meets the relationship of "waiting time 70-Y retransmission time-out 31 read in Step S105", and sets Y as the wait queue number 60 (Step S109). Subsequently, the transmission unit 21 adds a new queue entry 80 to the wait queue 52-Y (Step S110). The packet identifier generation unit 53 in the transmission unit 21 generates the packet identifier 37 (Step S111). The transmission unit 21 stores the normal packet 10 in processing and the packet identifier 37 generated in Step S111 in the queue entry 80 added in Step S110, and also initializes the retransmission count 81 in the queue entry 80 to one (Step S112).

The encapsulation unit 54 in the transmission unit 21 generates an encapsulated packet 34 on the basis of the packet identifier 37 generated in Step S111 and the normal packet 10 in processing, and outputs it to the lower layer processing unit 3 through the multiplex unit 22 (Step S113). At this time, the encapsulation unit 54 sets current time in the time stamp 38 in the encapsulated packet 34. Step S113 is one of the final steps.

3-2. Processing Flow Upon Packet Retransmission

Figure 12:
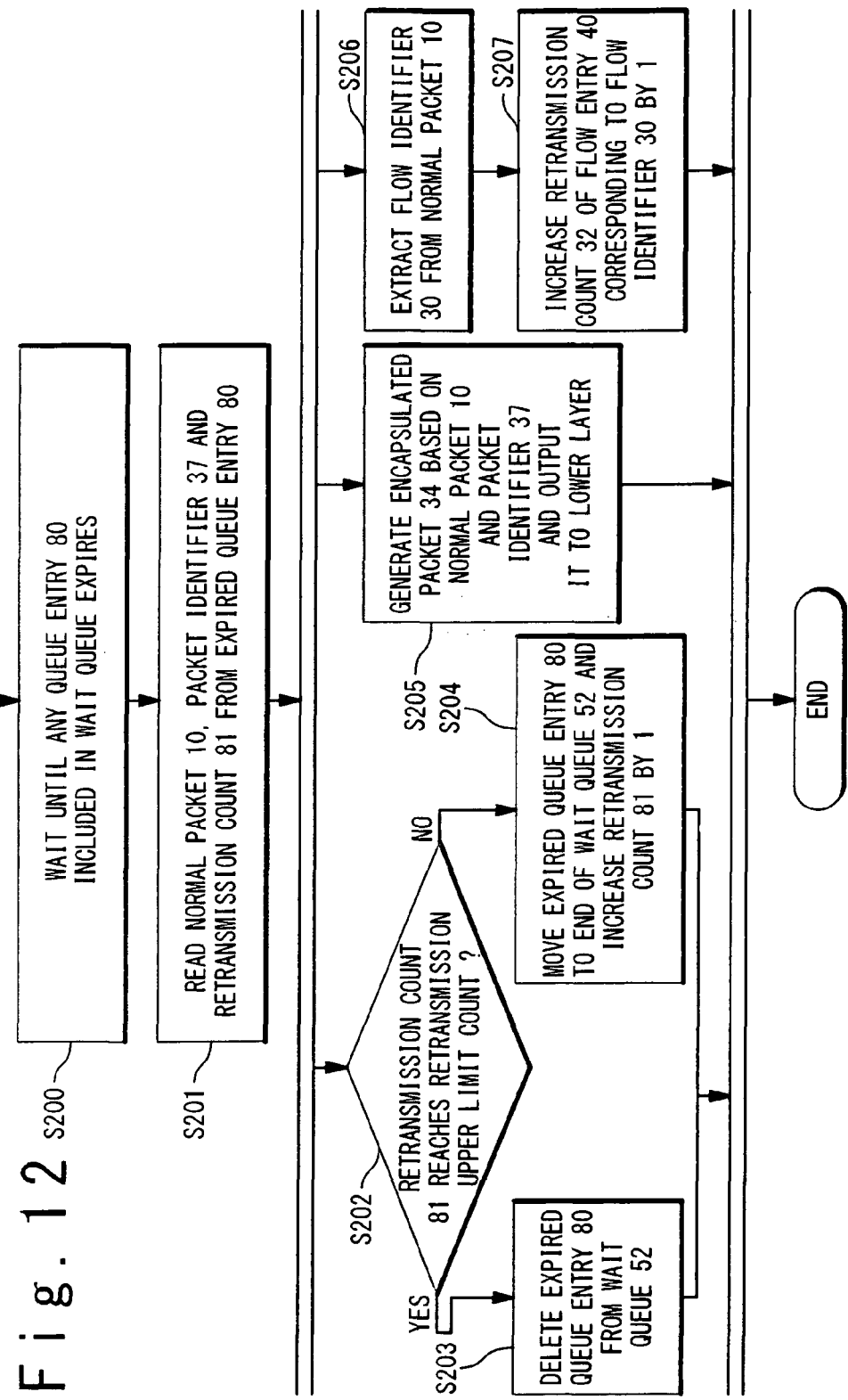
FIG. 12 is a flow chart showing processing at the time of packet retransmission in the exemplary embodiment of the present invention.

FIG. 12 is a flow chart at the time when the retransmission control device 1 performs packet retransmission triggered by expiration of a queue entry 80 in the wait queue 52 of the retransmission buffer 51.

The transmission unit 21 waits until a queue entry 80 in which the waiting time 70-X (1≤X≤M) has passed since the queue entry 80 was added to the wait queue 52-X emerges, i.e., until the queue entry 80 expires (Step S200). The transmission unit 21 reads the normal packet 10, the packet identifier 37 and the retransmission count 81 from the queue entry 80 that has expired in Step S200 (Step S201).

Subsequent to Step S201, Steps S202 to S204, Step S205 and Steps S206 and S207 are performed. Note that Steps S202 to S204, Step S205 and Steps S206 and S207 may be performed in parallel.

<Steps S202 to S204>

The transmission unit 21 determines whether or not the retransmission count 81 read in Step S201 reaches a predetermined upper limit count (Step S202). If the retransmission count 81 reaches the upper limit count (Step S202; Yes), the transmission unit 21 deletes the expired queue entry 80 from the wait queue 52 (Step S203). Step S203 is one of the final steps. On the other hand, if the retransmission count 81 does not reach the upper limit count (Step S202; No), the transmission unit 21 moves the expired queue entry 80 to the rearmost part of the wait queue 52, and increments the retransmission count 81 of the moved queue entry 80 by one (Step S204). Step S204 is one of the final steps.

<Step S205>

The encapsulation unit 54 of the transmission unit 21 generates an encapsulated packet 34 on the basis of the normal packet 10 and the packet identifier 37 read in Step S201. Then, the encapsulation unit 54 outputs the generated encapsulated packet 34 to the lower layer processing unit 3 through the multiplex unit 22. At this time, the encapsulation unit 54 sets the current time in the time stamp 38 of the encapsulated packet 34. Step S205 is one of the final steps.

<Steps S206 and S207>

The flow identifier generation unit 55 of the transmission unit 21 extracts the flow identifier 30 from the normal packet 10 read in Step S201 (Step S206). The flow management unit 26 increments by one the retransmission count 32 of the flow entry 40 corresponding to the flow identifier 30 extracted in Step S206 (Step S207). Step S207 is one of the final steps.

3-3. Processing Flow Upon Packet Reception

FIGS. 13A and 13B show a flow chart at the time when the retransmission control device 1 receives a reception packet 12 from the lower layer processing unit 3.

The retransmission control device 1 waits for input of a reception packet 12 from the lower layer processing unit 3 (Step S300). Upon input of the reception packet 12, the demultiplex unit 23 determines the type of the reception packer 12 (Step S301). If the reception packet 12 is a normal packet 10, Step S302 is performed. If the reception packet 12 is an encapsulated packet 34, Steps S303 to S306 are performed. If the reception packet 12 is an ACK packet 35, Steps S307 to S311 are performed.

<Step S302: Normal Packet Case>

The demultiplex unit 23 outputs the reception packet 12 (normal packet 10) inputted in Step S300 to the upper layer processing unit 2 through the multiplex unit 25. Step S302 is one of the final steps.

<Steps S303 to S306: Encapsulated Packet 34 Case>

The decapsulation unit 90 of the reception unit 24 extracts the packet identifier 37, the time stamp 38 and the normal packet 10 from the reception packet 12 (encapsulated packet 34) inputted in Step S300 (Step S303). Subsequent to Step S303, Step S304 and Steps S305 and S306 are performed. Note that Step S304, and Steps S305 and S306 may be performed in parallel.

In Step S304, the decapsulation unit 90 outputs the normal packet 10 extracted in Step S303 to the upper layer processing unit 2 through the multiplex unit 25. Step S304 is one of the final steps.

In Step S305, the ACK generation unit 91 extracts the flow identifier 30 from the normal packet 10 extracted in Step S303. In Step S306, the ACK generation unit 91 generates an ACK packet 35 on the basis of the extracted flow identifier 30, and the packet identifier 37 and the time stamp 38 extracted in Step S303. Then, the ACK generation unit 91 outputs the ACK packet 35 to the lower layer processing unit 3 through the multiplex unit 22. Step S306 is one of the final steps.

<Steps S307 to S311: ACK Packet 35 Case>

The ACK termination unit 92 of the reception unit 24 extracts the flow identifier 30, the packet identifier 37 and the time stamp 38 from the reception packet 12 (ACK packet 35) inputted in Step S300 (Step S307). Subsequent to Step S307, Step S308 and Steps S309 to S311 are performed. Note that Step S308, and Steps S309 to S311 may be performed in parallel.

In Step S308, the transmission unit 21 deletes, from the wait queues 52-1 to 52-M, a queue entry 80 having the same packet identifier 37 as the packet identifier 37 extracted in Step S307. Step S308 is one of the final steps.

In Step S309, the delay calculation unit 93 of the reception unit 24 calculates the round-trip delay time 36 from a difference between the time stamp 38 extracted in Step S307 and current time. Subsequent to Step S309, Step S310 and Step S311 are performed. Note that Step S310 and Step S311 may be performed in parallel.

In Step S310, the flow management unit 26 uses the round-trip delay time 36 calculated in Step S309 to update the retransmission time-out 31 of the flow entry 40 corresponding to the flow identifier 30 extracted in Step S307. Step S310 is one of the final steps.

In Step S311, the flow management unit 26 determines whether or not the round-trip delay time 36 calculated in Step S309 exceeds a round-trip delay time allowable by the retransmission buffer 51. If the round-trip delay time 36 exceeds the allowable time, the flow management unit 26 increments the delay excess count 33 of the flow entry 40 corresponding to the flow identifier 30 extracted in Step S307 by one. Step S311 is one of the final steps.

3-4. Processing Flow Upon Cleanup

FIG. 14 is a flow chart at the time of cleanup of the flow table 27, which is regularly performed by the flow management unit 26 of the retransmission control device 1. The flow management unit 26 performs the following loop processing on each of all flow entries 40 in the flow table 27.

The flow management unit 26 calculates an idle time from a difference between the last access time 41 of the target flow entry 40 and the current time (Step S400). Then, the flow management unit 26 determines whether or not the calculated idle time exceeds a predetermined threshold value (Step S401).

If the idle time exceeds the predetermined threshold value (Step S401; Yes), the flow management unit 26 deletes the target flow entry 40 from the flow table 27 (Step S402). Step S402 is one of final steps of the loop processing.

On the other hand, if the idle time does not exceed the predetermined threshold value (Step S401; No), the processing proceeds to Step S403. In Step S403, the flow management unit 26 compares the retransmission count 32 and the delay excess count 33 of the target flow entry 40 with the corresponding predetermined threshold values, respectively, to determine whether or not to apply the retransmission control to the flow corresponding to the flow entry 40.

If any of the retransmission count 32 and the delay excess count 33 exceeds the corresponding threshold value, i.e., if the retransmission control is not applied to the flow (Step S403: Yes), the loop processing is terminated.

On the other hand, if neither the retransmission count 32 nor the delay excess count 33 exceeds the corresponding threshold values, i.e., if the retransmission control is applied to the flow (Step S403: No), the processing proceeds to Step S404. In Step S404, the flow management unit 26 subtracts predetermined values from the retransmission count 32 and the delay excess count 33 of the target flow entry 40, respectively. If any of the resultant values becomes negative as a result of the subtractions, the subtraction result is corrected to zero. Step S404 is one of the final steps of the loop processing.

4. Other Configuration Examples

The retransmission control device 1 according to the present exemplary embodiment can be applied to an information processing device such as a PC (Personal Computer). FIG. 15 shows a configuration in the case where the retransmission control device 1 is applied to the information processing device. As shown in FIG. 15, the retransmission control device 1 is provided with a data processing device 200 and a memory device 201.

As the memory device 201, a RAM (Random Access Memory) or HDD (Hard Disk Drive) is exemplified. The memory device 201 stores the flow table 27, the waiting time list 50, the retransmission buffer 51, M (M is a natural number) wait queues 52-1 to 52-M in the retransmission buffer 51, and the like.

The data processing device 200 includes a CPU (Central Processing Unit). The data processing device 200 is provided with a processing determination unit 220, a transmission unit 221, a multiplex unit 222, a demultiplex unit 223, a reception unit 224, a multiplex unit 225 and a flow management unit 226. The processing determination unit 220, the transmission unit 221, the multiplex unit 222, the demultiplex unit 223, the reception unit 224, the multiplex unit 225 and the flow management unit 226 are the same as the processing determination unit 20, the transmission unit 21, the multiplex unit 22, the demultiplex unit 23, the reception unit 24, the multiplex unit 25 and the flow management unit 26 described above, respectively.

Note that these functional blocks of the data processing device 200 are achieved by the data processing device 200 executing a packet retransmission control program. The packet retransmission control program is a computer program executed by the data processing device 200, and stored in the memory device 201. The packet retransmission control program may be recorded in a tangible computer-readable recording medium.

5. Effects

The first effect is that it is possible, in the case where the opposite communication device does not have a retransmission control capability, to prevent the phenomenon in which the packet retransmission is excessively repeated and thus the communication efficiency is reduced. The reason for this is that the packet retransmission count is recorded for each flow, and if the retransmission count exceeds a predetermined threshold value, the retransmission control of subsequent packets belonging to the corresponding flow is disabled.

The second effect is that it is possible, in a situation where the round-trip delay times between a source and a plurality of destinations are different from each other, to reduce a waiting time for the retransmission and thus to improve the communication efficiency. The reason for this is that the round-trip delay time is measured for each flow, an appropriate retransmission time-out is calculated for each flow on the basis of the round-trip delay time, and the retransmission time-out for a flow corresponding to the packet is used at the time of retransmitting a packet.

The third effect is that it is possible, in the case where the round-trip delay time between a source and a destination exceeds a time that can be absorbed by the retransmission buffer, to prevent a malfunction of the retransmission control due to overflow of the retransmission buffer. The reason for this is that the round-trip delay time is measured for each flow, and if the delay excess count exceeds a predetermined threshold value, the retransmission control of subsequent packet belonging to the corresponding flow is disabled.

6. Modification Examples

FIG. 16 is a block diagram showing a modification example of the exemplary embodiment of the present invention. According to the present modification example, content of the flow table 27 of the retransmission control device 1 is referable and alterable (rewritten, added, and deleted) by an external controller 300.

More specifically, the retransmission control device 1 according to the present modification example is further provided with a controller communication unit 28 that can communicate with the external controller 300. In response to a table reference request from the controller 300, the controller communication unit 28 reads the specified content in the flow table 27 and sends the read content back to the controller 300. Moreover, in response to a table change request from the controller 300, the controller communication unit 28 changes (rewrites, adds, or deletes) the specified content in the flow table 27. Furthermore, in the case where content of the flow table 27 has been changed, the controller communication unit 28 informs the controller 300 of the change.

FIG. 17 is a conceptual diagram showing an example of the flow table 27 in the present modification example. Each flow entry 40 further includes, in addition to the information shown in the foregoing FIG. 4, a control mode 45 and a retransmission time-out setting 46 as the retransmission management information. Alternatively, only any one of the control mode 45 and the retransmission time-out setting 46 may be added to each flow entry 40. The controller 300 can appropriately change the control mode 45 or the retransmission time-out setting 46. In the following, a method for using each of the control mode 45 and the retransmission time-out setting 46 is described.

The control mode 45 takes any of the following three values, i.e., "autonomous control", "forced disabling" and "forced enabling". The case of the "autonomous control" is the same as the case of the above-described exemplary embodiment. That is, the retransmission control capability by the retransmission control device 1 is autonomously enabled/disabled on the basis of the retransmission count 32 or the delay excess count 33. In the case of the "forced disabling", the retransmission control capability by the retransmission control device 1 is forcibly disabled regardless of the retransmission count 32 or the delay excess count 33. In the case of the "forced enabling", the retransmission control capability by the retransmission control device 1 is forcibly enabled regardless of the retransmission count 32 or the delay excess count 33.

The controller 300 can freely set or change content of the control mode 45. More specifically, the controller 300 transmits a table change request instructing setting change of the control mode 45 associated with some target flow, to the target retransmission control device 1. In response to the table change request, the controller communication unit 28 of the retransmission control device 1 sets content of the control mode 45 of the flow entry 40 corresponding to the target flow.

At the time of packet transmission, the processing determination unit 20 of the retransmission control device 1 also refers to the control mode 45 of the appropriate flow entry 40. In the case where the control mode 45 is the "autonomous control", the processing determination unit 20 operates in the same manner as in the foregoing exemplary embodiment (see FIGS. 11A and 11B). In the case where the control mode 45 is the "forced disabling", the processing determination unit

20 performs Step S107 (see FIG. 11B) regardless of the retransmission count 32 or the delay excess count 33. In the case where the control mode 45 is the "forced enabling", the processing determination unit 20 performs Steps S108 to S113 (see FIG. 11B) regardless of the retransmission count 32 or the delay excess count 33.

The retransmission time-out setting 46 takes any of the following two values, i.e., "autonomous control" and "forced fixation". The case of the "autonomous control" is the same as the case of the above-described exemplary embodiment. That is, as described in Step S310 of the foregoing FIG. 13B, the retransmission time-out 31 of the flow entry 40 is autonomously updated on the basis of the round-trip delay time 36. On the other hand, in the case of the "forced fixation", Step S310 is not performed and a value of the retransmission time-out 31 is kept as is.

The controller 300 can freely set or change content of the retransmission time-out setting 46. More specifically, the controller 300 transmits a table change request instructing setting change of the retransmission time-out setting 46 associated with some target flow, to the target retransmission control device 1. In response to the table change request, the controller communication unit 28 of the retransmission control device 1 sets content of the retransmission time-out setting 46 of the flow entry 40 corresponding to the target flow. Note that a value of the retransmission time-out 31 of the flow entry 40 may also be set by the controller 300.

At the time of packet reception, the flow management unit 26 of the retransmission control device 1 also refers to the retransmission time-out setting 46 of the appropriate flow entry 40. In the case where the retransmission time-out setting 46 is the "autonomous control", the flow management unit 26 performs Step S310 (see FIG. 13B) in the same manner as in the foregoing exemplary embodiment. On the other hand, in the case where the retransmission time-out setting 46 is the "forced fixation", the flow management unit 26 skips Step S310 to keep the value of the retransmission time-out 31.

Besides, the controller 300 may transmit a table change request instructing addition of a new flow entry 40, to a target retransmission control device 1. Also, the controller 300 may transmit a table change request instructing deletion of an existing flow entry 40, to a target retransmission control device 1. Further, in the case where a flow entry 40 is "autonomously" added by the retransmission control device 1 (StepS104, see FIG. 11A), or a flow entry 40 is "autonomously" deleted (Step S402, see FIG. 14), the controller communication unit 28 informs the controller 300 of the addition or deletion. Also, in the case where the retransmission control capability is "autonomously" disabled by the retransmission control device 1, i.e., in the case where the retransmission count 32 of a flow entry 40 first exceeds a threshold value after performance of Step S207 (see FIG. 12), or the delay excess count 33 of the flow entry 40 first exceeds a threshold value after the execution of Step S311 (see FIG. 13B), the controller communication unit 28 informs the controller 300 of this.

Effects obtained by the present modification example are as follows. A communication section where the retransmission control capability should not be enabled (e.g., a communication section between a data center and the outside world, or between data centers) is often known. In this case, by preliminarily disabling the retransmission control capability in the communication section, useless retransmission packets occurring in the processing of the autonomous control can be suppressed. Also, regarding a communication path in which the maximum value of the round-trip delay time (RTT) can be estimated, a time for the retransmission time-out 31 to converge to an optimum value can be shortened by preliminarily setting the retransmission time-out 31 to the maximum value.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

(Supplementary Note 1)

A packet retransmission control device that performs retransmission control for a packet inputted from an upper layer, said packet retransmission control device comprising:

a flow table that indicates, with respect to each of flows to which packets belong, retransmission management information for managing said retransmission control; and a processing determination unit configured to refer to said flow table to determine whether or not to apply said retransmission control to said packet, wherein:

said retransmission management information includes, as a retransmission management parameter, at least one of a packet retransmission count and a delay excess count;

said delay excess count is a number of times that a round-trip delay time regarding a packet exceeds an allowable time;

said round-trip delay time is a time from a transmission time of a packet to a reception time of an acknowledgement responding to said packet;

said processing determination unit, when receiving a packet from said upper layer, refers to said flow table to obtain said retransmission management parameter associated with a flow to which said received packet belongs;

if said retransmission management parameter is equal to or less than a threshold value, said processing determination unit determines to apply said retransmission control to said received packet; and if said retransmission management parameter exceeds said threshold value, said processing determination unit stops application of said retransmission control to said received packet.

(Supplementary Note 2)

The packet retransmission control device according to Supplementary note 1, wherein:

said retransmission management parameter includes said packet retransmission count;

said processing determination unit, when receiving a packet from said upper layer, refers to said flow table to obtain said packet retransmission count associated with a flow to which said received packet belongs;

if said packet retransmission count is equal to or less than a retransmission count threshold value, said processing determination unit determines to apply said retransmission control to said received packet; and if said packet retransmission count exceeds said retransmission count threshold value, said processing determination unit stops applying said retransmission control to said received packet.

(Supplementary Note 3)

The packet retransmission control device according to Supplementary note 2, further comprising:

a transmission unit configured to receive said packet to which said retransmission control is applied from said processing determination unit, to accumulate said received packet in a retransmission buffer, and to output said received packet to a lower layer; and a reception unit that receives a packet from said lower layer, wherein:

if said reception unit fails to receive, within a retransmission time-out, an acknowledgement responding to said packet accumulated in said retransmission buffer, said transmission unit performs retransmission processing; and in said retransmission processing, said transmission unit retransmits said packet accumulated in said retransmission buffer to said lower layer, and increases said packet retransmission count associated with a flow to which the retransmission packet belongs in said flow table.

(Supplementary Note 4)

The packet retransmission control device according to Supplementary note 3, wherein:

said retransmission time-out is determined with respect to each flow;

said retransmission management information further includes said retransmission time-out determined with respect to each flow;

said processing determination unit, when receiving a packet from said upper layer, refers to said flow table to obtain said packet retransmission count and said retransmission time-out associated with the flow to which said received packet belongs; and said processing determination unit outputs said packet to which said retransmission control is applied as well as information of said associated retransmission time-out, to said transmission unit.

(Supplementary Note 5)

The packet retransmission control device according to Supplementary note 4, wherein when receiving said acknowledgement responding to said packet to which said retransmission control is applied; said reception unit calculates said round-trip delay time regarding the packet and updates, based on said calculated round-trip delay time, said retransmission time-out associated with the flow to which the packet belongs.

(Supplementary Note 6)

The packet retransmission control device according to Supplementary note 5, wherein:

said flow table is alterable by an external controller; and the updating of said retransmission time-out is forcibly enabled or disabled with respect to each flow by said external controller.

(Supplementary Note 7)

The packet retransmission control device according to any one of Supplementary notes 1 to 6, wherein:

said retransmission management parameter includes said delay excess count;

said processing determination unit, when receiving a packet from said upper layer, refers to said flow table to obtain said delay excess count associated with a flow to which said received packet belongs;

if said delay excess count is equal to or less than an excess count threshold value, said processing determination unit determines to apply said retransmission control to said received packet; and if said delay excess count exceeds said excess count threshold value, said processing determination unit stops applying said retransmission control to said received packet.

(Supplementary Note 8).

The packet retransmission control device according to Supplementary note 7, further comprising: a reception unit that receives a packet from a lower layer, wherein:

when receiving an acknowledgement responding to said packet to which said retransmission control is applied, said reception unit calculates said round-trip delay time regarding the packet; and if said calculated round-trip delay time exceeds said allowable time, said reception unit increases said delay excess count associated with a flow to which the packet belongs in said flow table.

(Supplementary Note 9)

The packet retransmission control device according to any one of Supplementary notes 1 to 8, further comprising: a flow management unit, wherein said flow management unit decreases said retransmission management parameter in said flow table with time, or decreases, every time said retransmission control is applied, said retransmission management parameter associated with the flow to which said packet to which said retransmission control is applied belongs.

(Supplementary Note 10)

The packet retransmission control device according to any one of Supplementary notes 1 to 9, wherein said flow table is referable and alterable by an external controller.

(Supplementary Note 11)

The packet retransmission control device according to any one of Supplementary notes 1 to 9, wherein:

said flow table is alterable by an external controller; and said retransmission control is forcibly enabled or disabled with respect to each flow regardless of said retransmission management parameter by said external controller.

(Supplementary Note 12)

The packet retransmission control device according to any one of Supplementary notes 1 to 11, wherein changed content of said flow table is notified from said packet retransmission control device to an external controller.

(Supplementary Note 13)

A packet retransmission control method that performs retransmission control for a packet inputted from an upper layer, said packet retransmission control method comprising:

receiving a packet from said upper layer; and determining, by referring to a flow table, whether or not to apply said retransmission control to said received packet, wherein:

said flow table indicates, with respect to each of flows to which packets belong, retransmission management information for managing said retransmission control;

said retransmission management information includes, as a retransmission management parameter, at least one of a packet retransmission count and a delay excess count;

said delay excess count is a number of times that a round-trip delay time regarding a packet exceeds an allowable time; and said round-trip delay time is a time from a transmission time of a packet to a reception time of an acknowledgement responding to said packet;

wherein said determining whether or not to apply comprises:

obtaining said retransmission management parameter associated with a flow to which said received packet belongs;

if said retransmission management parameter is equal to or less than a threshold value, determining to apply said retransmission control to said received packet; and if said retransmission management parameter exceeds said threshold value, stopping application of said retransmission control to said received packet.

(Supplementary Note 14)

A packet retransmission control program that causes a computer to execute a packet retransmission control processing that performs retransmission control for a packet inputted from an upper layer, said packet retransmission control processing comprising:

receiving a packet from said upper layer; and determining, by referring to a flow table, whether or not to apply said retransmission control to said received packet, wherein:

said flow table indicates, with respect to each of flows to which packets belong, retransmission management information for managing said retransmission control;

said retransmission management information includes, as a retransmission management parameter, at least one of a packet retransmission count and a delay excess count;

said delay excess count is a number of times that a round-trip delay time regarding a packet exceeds an allowable time; and said round-trip delay time is a time from a transmission time of a packet to a reception time of an acknowledgement responding to said packet;

wherein said determining whether or not to apply comprises:

obtaining said retransmission management parameter associated with a flow to which said received packet belongs;

if said retransmission management parameter is equal to or less than a threshold value, determining to apply said retransmission control to said received packet; and if said retransmission management parameter exceeds said threshold value, stopping application of said retransmission control to said received packet.

This application is based upon and claims the benefit of priority from Japanese patent application No. 2010-057381 filed on Mar. 15, 2010 and Japanese patent application No. 2010-247902 filed on Nov. 4, 2010, the disclosure of which is incorporated herein in its entirely, by reference.

The invention claimed is:

1. A packet retransmission control device that performs a retransmission control for a packet inputted from an upper layer, said packet retransmission control device comprising:

a flow table that indicates, with respect to each of flows, which are discriminated by a flow identifier, to which packets belong, retransmission management information for managing said retransmission control; and a processing determination unit configured to refer to said flow table to detemiine whether or not to apply said retransmission control to said packet, wherein said retransmission management information indicates a retransmission management parameter, which includes a packet retransmission count and a delay excess count, wherein said delay excess count includes a number of times that a round-trip delay time regarding a packet exceeds an allowable time, wherein said round-trip delay time includes a time from a transmission time of a packet to a reception time of an acknowledgement responding to said packet, wherein said processing determination unit, when receiving a packet from said upper layer, refers to said flow table to obtain said retransmission management parameter associated with a flow to which said received packet belongs, wherein, if said retransmission management parameter is equal to or less than a threshold value, said processing determination unit determines to apply said retransmission control to said received packet, and wherein, if said retransmission management parameter exceeds said threshold value, said processing determination unit stops application of said retransmission control to said received packet.

2. The packet retransmission control device according to claim 1, wherein said processing determination unit, when receiving a packet from said upper layer, refers to said flow table to obtain said packet retransmission count associated with a flow to which said received packet belongs, wherein, if said packet retransmission count is equal to or less than a retransmission count threshold value, said processing determination unit determines to apply said retransmission control to said received packet, and wherein, if said packet retransmission count exceeds said retransmission count threshold value, said processing determination unit stops applying said retransmission control to said received packet.

3. The packet retransmission control device according to claim 2, further comprising:

a transmission unit configured to receive said packet to which said retransmission control is applied from said processing determination unit, to accumulate said received packet in a retransmission buffer, and to output said received packet to a lower layer; and a reception unit that receives a packet from said lower layer, wherein, if said reception unit fails to receive, within a retransmission time-out, an acknowledgement responding to said packet accumulated in said retransmission buffer, said transmission unit performs retransmission processing, and wherein, in said retransmission processing, said transmission unit retransmits said packet accumulated in said retransmission buffer to said lower layer, and increases said packet retransmission count associated with a flow to which the retransmission packet belongs in said flow table.

4. The packet retransmission control device according to claim 3, wherein said retransmission time-out is determined with respect to each flow, wherein said retransmission management information further includes said retransmission time-out determined with respect to each flow, wherein said processing determination unit, when receiving a packet from said upper layer, refers to said flow table to obtain said packet retransmission count and said retransmission time-out associated with the flow to which said received packet belongs, and wherein said processing determination unit outputs said packet to which said retransmission control is applied as well as information of said associated retransmission time-out, to said transmission unit.

5. The packet retransmission control device according to claim 4, wherein, when receiving said acknowledgement responding to said packet to which said retransmission control is applied, said reception unit calculates said round-trip delay time regarding the packet and updates, based on said calculated round-trip delay time, said retransmission time-out associated with the flow to which the packet belongs.

6. The packet retransmission control device according to claim 5, wherein said flow table is alterable by an external controller, and wherein the updating of said retransmission time-out is forcibly enabled or disabled with respect to each flow by said external controller.

7. The packet retransmission control device according to claim 1,
  wherein said processing determination unit, when receiving a packet from said upper layer, refers to said flow table to obtain said delay excess count associated with a flow to which said received packet belongs,
  wherein, if said delay excess count is equal to or less than an excess count threshold value, said processing determination unit determines to apply said retransmission control to said received packet, and
  wherein, if said delay excess count exceeds said excess count threshold value, said processing determination unit stops applying said retransmission control to said received packet.

8. The packet retransmission control device according to claim 7, further comprising:
  a reception unit that receives a packet from a lower layer,
  wherein, when receiving an acknowledgement responding to said packet to which said retransmission control is applied, said reception unit calculates said round-trip delay time regarding the packet, and
  wherein, if said calculated round-trip delay time exceeds said allowable time, said reception unit increases said delay excess count associated with a flow to which the packet belongs in said flow table.

9. The packet retransmission control device according to claim 1, further comprising:
  a flow management unit,
  wherein said flow management unit decreases said retransmission management parameter in said flow table with time, or decreases, every time said retransmission control is applied, said retransmission management parameter associated with the flow to which said packet to which said retransmission control is applied belongs.

10. The packet retransmission control device according to claim 1, wherein said flow table is referable and alterable by an external controller.

11. The packet retransmission control device according to claim 1, wherein said flow table is alterable by an external controller, and
  wherein said retransmission control is forcibly enabled or disabled with respect to each flow regardless of said retransmission management parameter by said external controller.

12. The packet retransmission control device according to claim 1, wherein a changed content of said flow table is notified from said packet retransmission control device to an external controller.

13. A packet retransmission control method that performs a retransmission control for a packet inputted from an upper layer, said packet retransmission control method comprising:
  receiving a packet from said upper layer; and
  determining, by referring to a flow table, whether or not to apply said retransmission control to said received packet,
  wherein said flow table indicates, with respect to each of flows, which are discriminated by a flow identifier, to which packets belong, retransmission management information for managing said retransmission control,
  wherein said retransmission management information indicates a retransmission management parameter, which includes a packet retransmission count and a delay excess count,
  wherein said delay excess count includes a number of times that a round-trip delay time regarding a packet exceeds an allowable time,
  wherein said round-trip delay time includes a time from a transmission time of a packet to a reception time of an acknowledgement responding to said packet, and
  wherein said determining whether or not to apply comprises:
    obtaining said retransmission management parameter associated with a flow to which said received packet belongs;
    if said retransmission management parameter is equal to or less than a threshold value, determining to apply said retransmission control to said received packet; and
    if said retransmission management parameter exceeds said threshold value, stopping application of said retransmission control to said received packet.

14. A packet retransmission control program recorded on a non-transitory tangible computer-readable medium that, when executed, causes a computer to execute a packet retransmission control processing that perfouns a retransmission control for a packet inputted from an upper layer, said packet retransmission control processing comprising:
  receiving a packet from said upper layer; and
  determining, by referring to a flow table, whether or not to apply said retransmission control to said received packet,
  wherein said flow table indicates, with respect to each of flows, which are discriminated by a flow identifier, to which packets belong, retransmission management information for managing said retransmission control,
  wherein said retransmission management information indicates a retransmission management parameter, which includes a packet retransmission count and a delay excess count,
  wherein said delay excess count includes a number of times that a round-trip delay time regarding a packet exceeds an allowable time,
  wherein said round-trip delay time includes a time from a transmission time of a packet to a reception time of an acknowledgement responding to said packet, and
  wherein said determining whether or not to apply comprises:
    obtaining said retransmission management parameter associated with a flow to which said received packet belongs;
    if said retransmission management parameter is equal to or less than a threshold value, determining to apply said retransmission control to said received packet; and
    if said retransmission management parameter exceeds said threshold value, stopping application of said retransmission control to said received packet.

15. The packet retransmission control device according to claim 1, wherein a retransmission management is performed in accordance with the delay excess count.

16. The packet retransmission control device according to claim 1, wherein, whether the retransmission control is applied or not is determined based on the retransmission management parameter.

17. The method according to claim 13, wherein said packet retransmission control method further comprises performing a retransmission management in accordance with the delay excess count.

18. The method according to claim 13, wherein, whether the retransmission control is applied or not is determined based on the retransmission management parameter.

19. The packet retransmission control program according to claim 14, wherein said packet retransmission control processing further comprises performing a retransmission management in accordance with the delay excess count.

20. The packet retransmission control program according to claim 14, wherein, whether the retransmission control is applied or not is determined based on the retransmission management parameter.

* * * * *